US008289132B2

(12) United States Patent
Kady

(10) Patent No.: US 8,289,132 B2
(45) Date of Patent: *Oct. 16, 2012

(54) LOCKING SYSTEM FOR ELECTRONIC EQUIPMENT

(75) Inventor: Darren Kady, Cornelius, NC (US)

(73) Assignee: Direct Source International, Inc., Bluffton, SC (US)

( * ) Notice: Subject to any disclaimer, the term of this patent is extended or adjusted under 35 U.S.C. 154(b) by 1084 days.

This patent is subject to a terminal disclaimer.

(21) Appl. No.: 12/166,180

(22) Filed: Jul. 1, 2008

(65) Prior Publication Data

US 2009/0015372 A1    Jan. 15, 2009

Related U.S. Application Data

(63) Continuation-in-part of application No. 10/339,711, filed on Jan. 9, 2003, now Pat. No. 7,394,347, which is a continuation-in-part of application No. 10/690,795, filed on Oct. 22, 2003, now abandoned, which is a continuation-in-part of application No. 10/273,819, filed on Oct. 18, 2002, now abandoned.

(60) Provisional application No. 60/065,941, filed on Oct. 27, 1997.

(51) Int. Cl.
*G05B 19/00* (2006.01)

(52) U.S. Cl. ...................................................... 340/5.54

(58) Field of Classification Search ................. 340/5.54, 340/5.21, 3.1, 5.51; 380/229, 232
See application file for complete search history.

(56) References Cited

U.S. PATENT DOCUMENTS 7,394,347 B2 *    7/2008   Kady .......................... 340/5.54

* cited by examiner

*Primary Examiner* — Vernal Brown
(74) *Attorney, Agent, or Firm* — Sheldon H. Parker, Esq.

(57) ABSTRACT

The operating control system can be use on electronic equipment, such as cell phones, computers, engine analyzers, etc. An input device, programming a single or multiple devices, enables the input of user access data by a primary user for multiple modes. Access for secondary users can be controlled and monitored by the primary user. The system requires password entry upon the total loss of power, shutting down the system if the password is not obtained. In another embodiment the system differentiates between power outages, removal of power, loss due to water and normal loss of power due to use. A further embodiment tracks usage of the device by units, enabling primary user refill of the units.

20 Claims, 18 Drawing Sheets

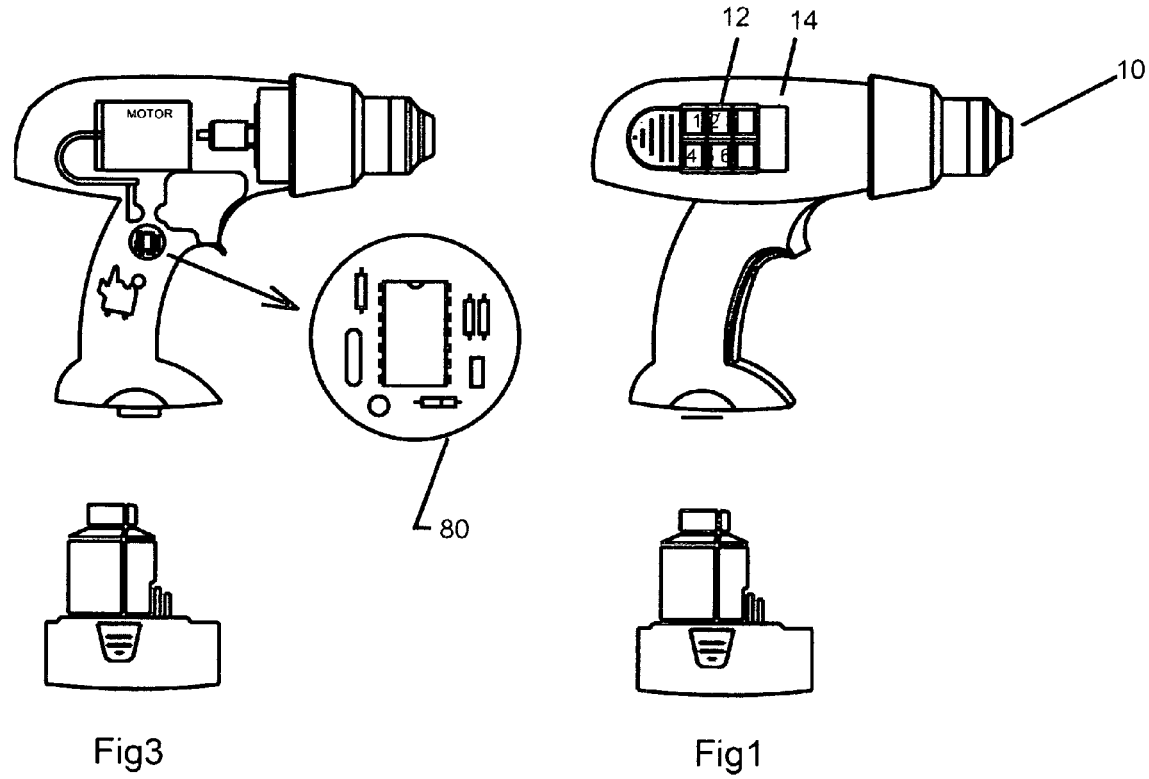
Fig3
Fig1
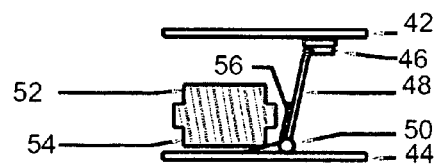
Fig2

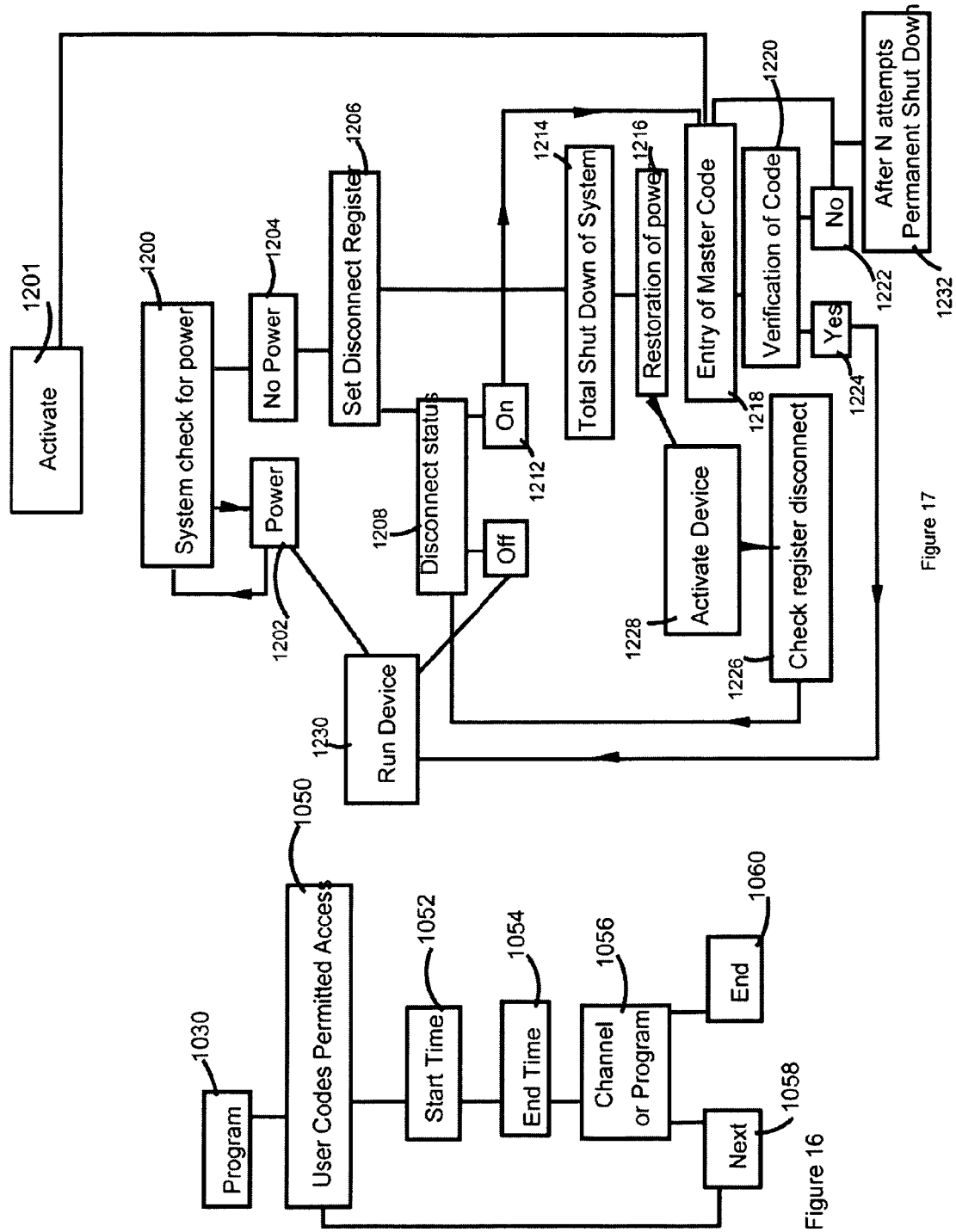

LOCKING SYSTEM FOR ELECTRONIC EQUIPMENT

CROSS REFERENCE TO RELATED APPLICATIONS

This application is a continuation in part of application U.S. Ser. No. 10/339,711 filed on Jan. 9, 2003 and U.S. Ser. No. 10/690,795 filed on Oct. 10, 2003, now abandoned, which are a continuations in part of U.S. Ser. No. 10/273,819 filed on Oct. 18, 2002, which is a continuation in part of U.S. Pat. No. 6,469,615 issued on Oct. 22, 2002 which claims priority from provisional application Ser. No. 60/065,941 filed on Oct. 27, 1997 the contents of all are incorporated herein as though recited in full.

BACKGROUND OF THE INVENTION

1. Field of the Invention

The device relates to a safety and security device that, once activated, allows the electronic equipment to run for a pre-programmed period ranging from minutes to years. In some embodiments, the device is used as an antitheft device as without the code use of the device is prohibited, preventing theft and resale of protected equipment.

2. Brief Description of the Prior Art

Electronic devices offer a temptation to thieves, as they are easy to resell due to lack of distinctive modes. Although people will mark their electronic devices, such as cell phones, computers, etc., unless the stolen device is resold through a legitimate vendor, there is no hope for recovery.

SUMMARY OF THE INVENTION

The locking system disclosed is for use on electronics, such as computers, cameras, cell phones, VCRs, DVDs, etc. and mechanical equipment, tools, heavy equipment and machinery. The system provides the option of permitting the equipment to be operable or inoperable for a predetermined period of time, selection of specific operable modes or being completely shut down with operation permitted only through code entry.

The operating control system is for use with equipment having a power source, an input device, at least one activation/deactivation member, and a control member. The control member, such as a separate chip or programming embedded into existing chips, either uses a compatible input device to enable the input of user access codes or uses an input device inherent in the equipment, such as the buttons on a cell phone. The independent input device would generally be used in situations where the control device is being added into the equipment after manufacture or the equipment is too small for an integral input device. Input can also be through wireless means, such as infra red, Bluetooth, telephone signals, etc. Although adding the control member onto an existing piece of equipment does not provide the extent of protection that is achieved by incorporating the control system at time of manufacture, it does provide more security than without the system. In the preferred embodiments, a readout panel, either integral, for example a cell phone, computer or camera screen, or separate, such as a, card reader, remote monitoring site, is used to monitor the status of the equipment. The readout can also be an audio output, or combination of audio and visual, thereby enabling the control system to be programmed via phone or by the visually impaired. The control member is in communication with the input device, readout panel (if included), power source, and activation/deactivation member. The control member prevents operation without at least the initial entry of a primary user code and can, in some embodiments, be programmed to control the internal functions of the electronic device, such as permitting the viewing of certain channels, or by a certain person, on a TV during a predetermined time, and other channels, or by another party, during other times. Secondary access codes permit the system to be programmed to permit only activation of the system, eliminating any reprogramming options, by those having the secondary codes. The system can also permit cell phone calls out, but not in, or vise versa, during set time periods. Any equipment having electronic components can be incorporated with the disclosed system to provide the ability to selectively determine which modes are active for specific time periods. In digital equipment, such as cameras, camcorders, etc., the capabilities are increased due to the versatility of the digital technology and it should be noted that any of the capabilities disclosed herein with one digital system can be incorporated in other digital systems.

The control system includes a programmable timer to communicate with the control member thereby enabling access to the selected mode for the predetermined period of time entered at the input system. Preferably the memory within all embodiments is non-volatile thereby preventing a loss of the settings upon loss of power, although in some embodiments a volatile memory can be beneficial. A clock member, if not already inherent in the system, can be added to track time, activate, and deactivate the timer based on user input. In cellular phones, computers, cameras, etc., the operation of the equipment is dependent upon microchips, or microprocessors, and would not require the wiring of a power tool, or other non-processor based equipment. The versatility of the locking system enables it, as disclosed in U.S. Pat. No. 6,469,615 issued Oct. 22, 2002, to be use on equipment such as hand tools, electronics or wheeled vehicles as well as cell phones, digital and non-digital cameras, etc.

BRIEF DESCRIPTION OF THE DRAWINGS

The advantages of the instant disclosure will become more apparent when read with the specification and the drawings, wherein:

FIG. 1 is a side view of an example hand tool incorporating the locking system;

FIG. 2 is a cutaway view of the interior of the locking arm and solenoid of the instant invention;

FIG. 3 is a top view of an example controller configuration;

FIG. 16 is a flow chart of the programming portion of the flow chart of FIG. 15;

FIG. 17 is a flow chart for a system that shuts down and requires reentry of the password upon the loss of power;

DETAILED DESCRIPTION OF THE INVENTION

Definitions

Figure 4:
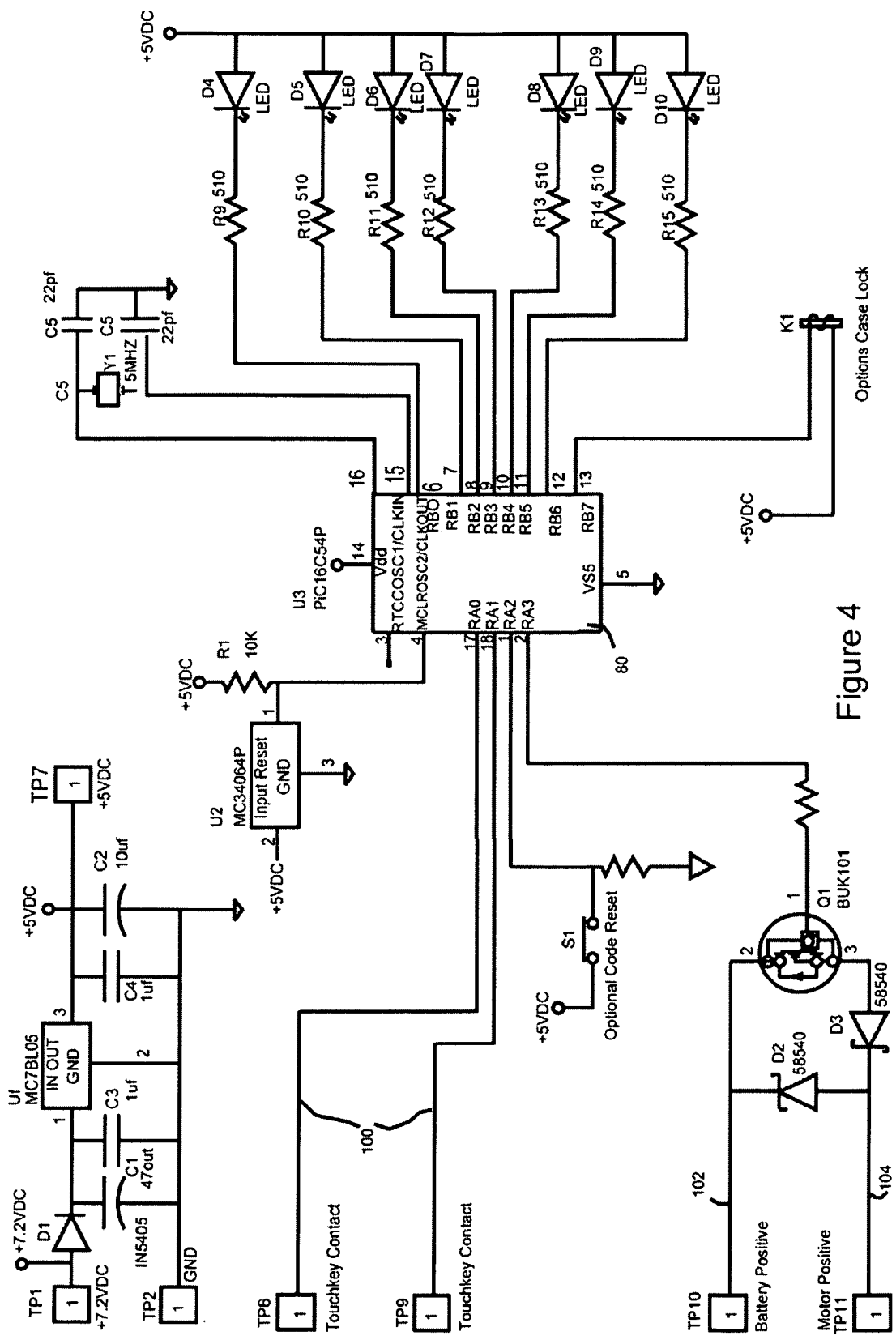
FIG. 4 is the schematic of an example wiring for the locking system for use with a hand tool.

For the purposes herein "electronic equipment" shall refer to any device having the ability to receive and execute commands, for example cell phones, TVs, computers, stoves, microwaves, etc For the purposes herein "microchip" shall refer to any set of integrated circuits on a semiconductor base designed to perform a set of electronic tasks.

For the purposes herein "microprocessor" shall refer a microchip which contains the whole central processing unit of a computer.

For the purposes herein the term "primary password" shall refer to a password, or multiple passwords, that enable programming of all features of the electronic device. When a password is received from the manufacturer for replacement by an easier to remember password, both the manufacturer's password and the user's passwords shall be considered primary passwords. The primary password has the ability to assign limited programming rights to secondary passwords.

For the purposes herein "programmable" shall refer to the ability of the microprocessor to receive and execute instructions from a user.

For the purposes herein "programming cradles" shall refer to any holder for a device through which programming is received, for example as used in the real estate and manufactured by General Electric.

For the purposed herein the term "secondary password" shall mean any password that does not have programming privileges of all features. The secondary password can have limited programming rights, however these rights are established by the primary password.

The disclosed invention relates to a programmable system having multiple user programmable modes including, but not limited to, restricting accessibility to specific portions of the system, or only to specific people, and a coded locking mechanism that discourages theft and restricts or eliminates use during a predetermined time frame. In addition to the inherent advantages obtained through the locking system as disclosed, further safety advantages are achieved simply by its existence. It will be obvious to anyone who buys an item containing the locking system that unless the seller has the code, the item is most likely stolen. The disclosed locking system controls the activation of the item, preventing activation, once the current time period has lapsed without the entry of user codes. Without access to the codes, the item is useless and unsaleable.

Electronic devices, such as cell phones, palm pilots and other hand held data access devices, cameras, computers, VCRs, televisions, MP3 players, etc. all fall into the category of easy theft devices with high resale value. Their use of programmable chips, however, makes these valuable devices easy to modify to incorporate the advantages of the disclosed system. The use of microchips, microprocessors or analog, technology, however, permits various functions to be monitored, such as scheduling service, based on use time or the number of hours an item has been used.

Alternatively, in equipment such as VCRs and televisions, the system can be a separately encased unit that is retrofitted into the power source, such as the power cord or plug. In the embodiments where it is added on after time of manufacture, the control system would be a separate unit, or units, that would work through the power cord or plug or, such as in the case of computers, a plug in board. In some embodiments, it can be necessary to have two pieces to the add-on unit to enable easy access to the input area while still connecting with the power input of the equipment. The add-on units are most applicable for use on TV's, radios, stereos, computers and other larger equipment that can provide a location for a connection between the power supply and the equipment. It should be noted, however, that this embodiment would not provide the multiple control capabilities enabled by a system that is integrated into the equipment at time of manufacture.

Access through keypads or other input means can be used, such as magnetic card readers, fingerprint or retinal recognition, standard keys, telephone signals, programming cradles, or any applicable wireless technology, etc. The method of programming the device is dependent upon the type of device, size, etc. For example, touch key scanning, swipe card readers, or other methods of transmitting and receiving static data, can easily be incorporated into applicable devices, such as projectors or lab equipment or add on devices to TV, computers, etc.

The input devices taught herein can be remote (such as a TV), integral with (such as a cell phone) or removable (such as downloading onto a PDA) from the equipment, depending upon the size and type of equipment. A new line of technology, as taught in U.S. Pat. No. 7,148,803, is aimed at using personal wireless devices incorporating RFID and sensors to read temperature and other health issues. The addition of the technology will increase the cost of the device a well as the likelihood of theft.

The disclosed technology provides benefits in a laboratory or other setting where equipment is centrally stored and removed for use. Locking stations, similar to those used for laptops, hold the equipment in place until the user enters their user ID code into the locking station. The equipment is then released with the equipment ID and other relevant data, including activation/deactivation time, being stored in the locking station and equipment. Each employee would have a personalized touch key, or other wireless or non-wireless access means, that would record the employee name, time of activation, and any other information required by the employer prior to activation of the equipment.

When the device cannot be programmed using systems inherent for the use of the device, such as available on a computer, TV, digital camera or cell phone, alternative programming "keys" containing static data, such as a touch key, swipe card, etc. can be used. Alternatively, data can be transferred, via USB cable or wireless means such as cell or landline phones. The disclosed technology provides the advantage that an employer, or parent, can program the device with the pertinent data, including activation time, and, if applicable activated modes. In the preferred embodiments the data downloaded into the system cannot be changed except by a user having primary, or programming, rights. This is advantageous when using equipment, such as machinery that must be shut down after a specific period of use as the preprogrammed time relieves the user from the responsibility of watching a clock. Although on some equipment shut down could also be obtained through other methods, the disclosed system provides the additional advantages as set forth herein, thereby consolidating systems.

When installed on a computer, the disclosed system can be connected directly to the power supply or programmed into the chip, hard drive or other storage/memory system; permitting businesses that sell computer time to automatically shut down the computer unless additional time is purchased. In home use, the system permits scheduling and/or control of the amount of time, or specific time periods, the computer, or other electronic devices such as a TV, cell phones, VCR, camcorders, etc., can be used by someone without the programming, or primary, access code. Thus, the computer, VCR, cell phone or TV could only be activated after homework time is over, during specific time periods, for a certain period of time, etc.

Computers are especially adaptable to keyboard programming of the system, although a keyboard interface, such as used with PDA's, can be included with any of the locking systems disclosed. A program embedded in the device's microchip and/or hard drive can allow for a either a simple timer setting that is activated through key input on the keyboard or setting the more complex functions as disclosed herein. As an option, a direct coding key can be incorporated on the keyboard that automatically accesses the program and permits activation, setting changes, etc. Although computer lock out programs are known in the prior art, they totally lock out use of the computer in an all or nothing method. The disclosed system permits access to the computer, or other electronic equipment, for a predetermined period of time either at random times or within a specific scheduled time period. The system can be programmed to automatically renew the scheduled time periods for a predetermined number of extensions to be set by the user. Optionally, a programming user-determined number of extensions can be programmed into the system permitting the user to extend the amount of time to use the device without interruption. To prevent the extensions from continuing indefinitely, the primary user, or manufacturer, can program in the maximum number of extensions accessible within the specific time period. For example, the system can be set to enable the computer to be turned on at a predetermined time, used for a specific time period, and if desired specific websites, after which the computer cannot be used until the next preprogrammed activation time. This enables a parent to leave the house after programming the schedule for the computer, or other electronic device or equipment, to activate at 6 pm until 10 pm after which it either deactivates until the follow day at 6 pm or is activated in response to other programming by the primary user. The primary user entering the time restraints would set up the program with a primary user code to prevent unauthorized changes to the program. The program would continue to "loop" through with the set restrictions until altered by the primary user. It should be noted that the continuation of the preprogrammed loop would eliminate some of the effectiveness of the anti-theft feature unless a secondary password was required each day, or other time period. For example, a parent would program a child's phone with certain use parameters for the school term. The child would need to activate the phone each morning using the secondary password.

One of the programmable modes disclosed herein is a partial activation mode, as described in detail hereinafter with relationship to cell phones. Using this mode, the user can restrict partial use of the electronic equipment, for example a computer can be programmed to restrict certain applications, such as web access, instant messages, email, specific websites or type of site, during specific blackout time periods. In cell phones restricted numbers can be entered, etc. For example, children could be prevented from surfing the web except during specific time periods. Or computer games could only be accessed for a restricted time, however the computer could be used for word processing or other homework related activities. This mode enables the computer to be used, but in a restricted manner, based upon primary user programming. Additionally, sub-user ID's can be used to permit individual access to an electronic device. This is advantageous with children having different age restrictions by permitting the older children to access programs, make long distance calls, etc., that are unavailable to younger children.

The disclosed locking system is also advantageous for rental equipment, such as generators, compressors, VCR's, etc., in that the rented equipment can be programmed for a specific period of time and after that point be automatically deactivated. This discourages the theft of rental equipment, thereby reducing insurance and liability, since by preventing unauthorized use, especially when used in conjunction with larger equipment, insurance rates would potentially be reduced.

In electronic equipment, such as TVs, VCRs, etc. containing infrared remote controllers, the timing activation system can be activated through the remote controller. Once activated the program would appear on the screen and utilize either existing or specific keys to set the shut down time, user time periods, or extend the time period, etc. This would be an inexpensive addition to a controller and increase user convenience. Alternatively, the controller itself can be used to set the time of use, without the appearance of the setting program on the screen.

It should be noted that the use of analogue, key scanners, infrared, fingerprint or retinal recognition, etc. taught herein for use by a specific embodiment, is not limited to that embodiment. Each embodiment of the locking system disclosed herein can incorporate the electronics, memory, etc. as described herein in relation to any other embodiment.

For optimal use, the disclosed system requires initial set up with the current program and periodic updates. The set up will be dependent upon the embodiment incorporated and, for the most part will be evident.

A hand drill, as illustrated in FIGS. 1 and 2, is used to illustrate the disclosed mechanism used to limit user time, however this is as an example only and is not intended to limit the invention. The power tool 10 is illustrated in FIG. 1 ready for use, incorporating a numeric keypad 12 as the locking mechanism and other activating mechanisms will be apparent to those skilled in the art.

The time can be set through any means appropriate to the equipment being used as well as the final use. For example, the time can be through repeatedly touching a specific key, jumping the time by predetermined increments. Alternatively, an "enter" key can be provided which allows entry of the unlocking code and subsequent entry of a predetermined period of time. Preferably, all timed locking systems are provided with nonvolatile memory to prevent the loss of programmed instructions in the event the item's battery goes dead or is removed. This is more critical with rechargeable hand tools where completely discharging the battery is some-times required to fully recharge. If requires password and unplugged becomes inoperable.

In some uses it can be advantageous, in devices that require passwords to operate, for the system to be programmed to eliminate all, or some, of the passwords contained in memory once power is lost or there is a substantial power variation, such as occurs in recharging. If the system is programmed to eliminate the master or operating password, the user would be required to contact an authorized agent, such as the manufacturer or a head office, to reprogram a new password or obtain a password device, such as touch key. If the programming eliminates the secondary user passwords, the master, or primary, user would need to program in new passwords. The device would be inoperable until an acceptable reentry sequence is entered. The use if a nonvolatile memory enables the basic programming to be retained within the system, with only the password being removed.

The incorporation of a microchip to register the locking codes and program the activation time further provides the added ability to monitor various other tool functions. For example, an LED display 14 of FIG. 1 can be included which indicates the activation time remaining and, if desired, the current status of the tool. The status can include, for example, current battery power (both during recharge and discharge), pressure remaining when air tools are used, rpm and direction of drills, etc. This is of optimum use in monitoring the status of rechargeable batteries. Since many rechargeable batteries do not either fully charge unless fully discharged prior to recharging, the battery-monitoring system permits optimum use and management of the battery. It should also be noted that an LED could be provided on the recharging system to monitor the battery recharge thereby serving as a double check to the LED on the device being charged.

Figure 5:
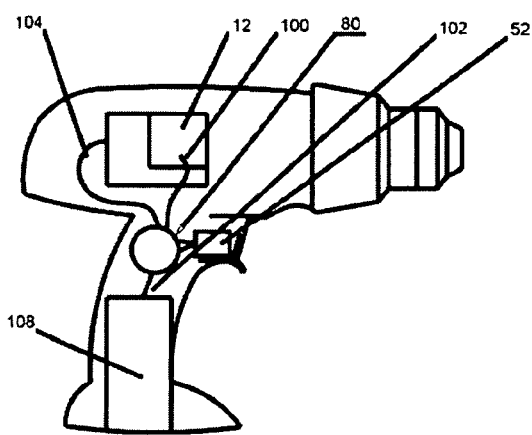
FIG. 5 is a cutaway side view of the interior of the hand tool of FIG. 1.

In FIG. 2, one design of the internal activation unit 40 is illustrated. The locking arm 48 is supported between the upper case side 42 and the lower case side 44. The spring tension 50 is designed to place the solenoid contact 56 in physical contact with the solenoid 52 when the locking arm 48 is pulled back during use. Once the locking arm 48 is released, the solenoid contact 56 is removed from contact with the solenoid 52. The solenoid 52 receives power from the battery 108 (FIG. 5) through the controller 80, an example of which is illustrated in more detail in FIG. 3. As can be seen from the example schematic of FIG. 4, the controller 80 serves as the central processing area, with all input and output passing through the controller 80. The controller 80 is connected directly to the locking mechanism, such as a numeric keypad 12, through the keypad wiring 100. The battery wiring 102 and motor wiring 104 also feed into the controller 80. Once the locking means, such as numeric keypad 12, is activated, all connections are made and power is free to go to the driver specific to the power tool 10. The exact schematic of the wiring is not critical, as the criticality lies with in the interaction between the locking means and the controller 80. The interior of the hand tool 10, as shown in FIG. 5, is traditionally spaced, with the controller 80 located within the handle area. In this embodiment, the various connecting wires 100, 102 and 104 are exposed and, in the event of theft, the case can be opened and the wires cut 7 and crossed to bypass the controller 80. In order to prevent a thief from opening the case and by passing the controller 80, the case is provided with a safety lock key having a number of different embodiments. One embodiment is to incorporate a locking member, wired to the control through the locking wire 156 that is deactivated by a locking code key or other compatible methods. The controller 80 can be programmed to allow the case to release, for example through a separate code being entered or by holding down the last number of the existing code for a predetermined time period. A separate code is preferable in that it prevents any unauthorized access to the interior of the case.

Figure 6:
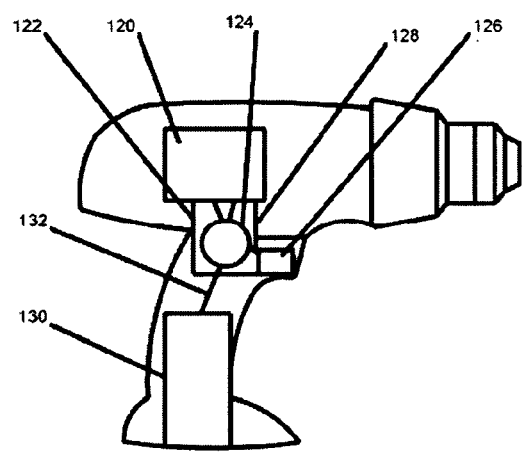
FIG. 6 is a cutaway side view of an alternate embodiment of a hand tool utilizing the disclosed locking system.

In an alternative embodiment to the safety lock key, the solenoid 126 and wiring 122 are encased in an epoxy, indicated herein as region 128, as illustrated in FIG. 6. By encasing the wiring 122 within the epoxy, it is impossible to rewire the unit and bypass the controller 124. Other materials, known in the art, can be used to replace the epoxy. To facilitate the placement of the epoxy region 128, the wiring 122 from the motor 120 exits the motor casing proximate the controller 124, which has been placed as close as possible to the solenoid 126. This revised placement reduces the area to be protected, thereby reducing material and labor costs. Revising the placement of the battery 130 is difficult, preventing in some instances the battery wiring 132 from being covered. However, with the controller 124 and solenoid 126 both encased in epoxy, there would be no value to cutting the battery wire 132, as there would not be any accessible power connections.

Figure 7:
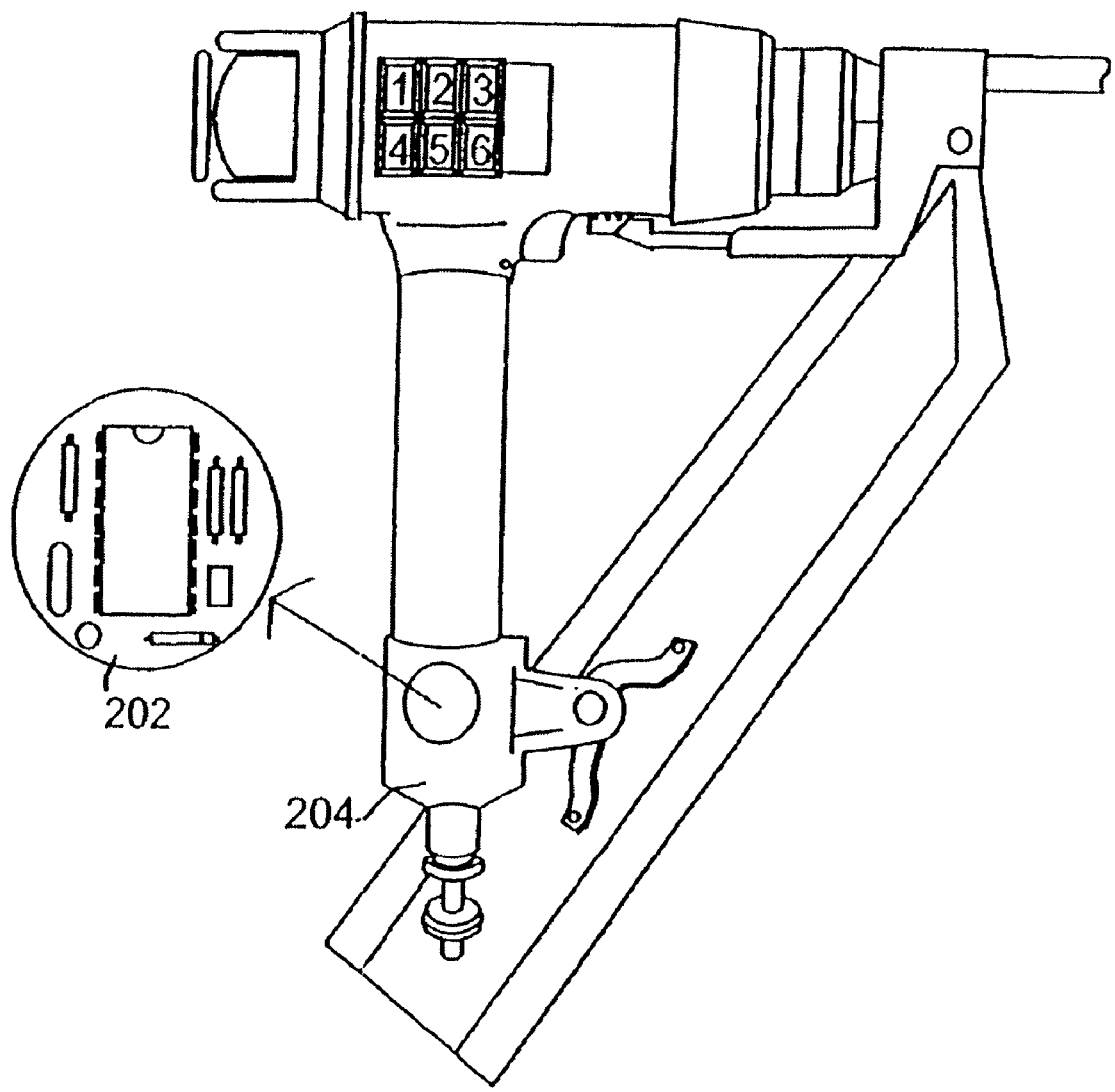
FIG. 7 is a side view of the instant system for use with a air tool system.
Figure 8:
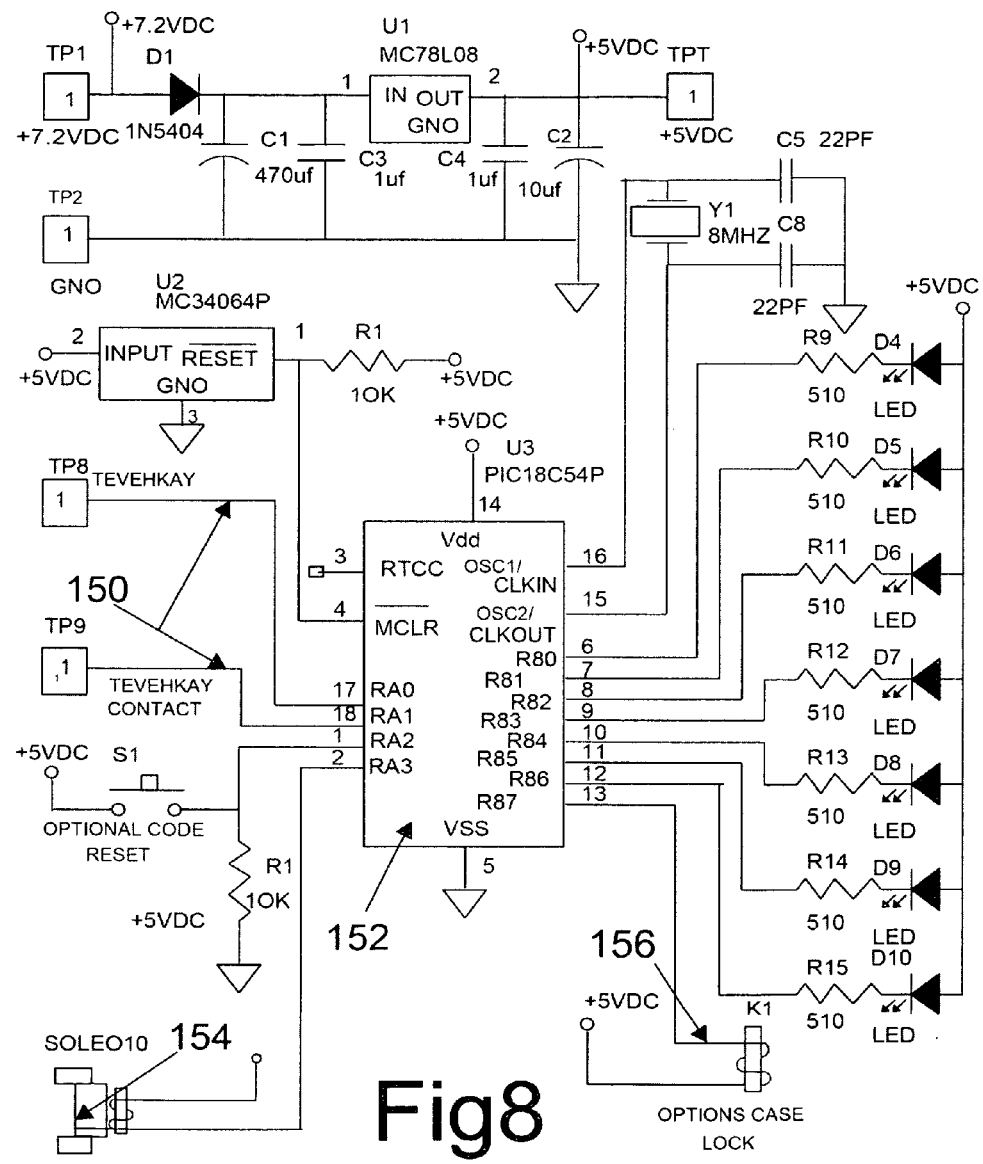
FIG. 8 is a schematic of the wiring for use with the locking system used in conjunction with air tools.

In FIG. 7, the locking system is illustrated being used with an air tool 200, 8 although it should be noted that the system can also be used with propane, gas, and diesel tools and equipment. The controller unit 202, as illustrated, is located in the handle 204 of the air tool. As can be seen in the example schematics of FIG. 4 (battery) and FIG. 8 (air tool) there is little difference in wiring between the two. As stated, in the schematic of FIG. 4 the touch key-wiring 100 goes to the controller 80, as does the battery wire 102 and the motor wire 104. In the air tool, or other removed power source, the touch key wiring 150 and solenoid 154 wiring feed into the controller 152 and onto the driver, the battery and motor connections being eliminated.

As stated heretofore, the disclosed system can be easily incorporated with electronic equipment. The programming of the equipment can be through a number of methods and additional methods will become evident as technology changes and will be evident to those skilled in the art.

Rewrite swipe cards are gaining popularity and can easily be incorporated with the disclosed system. The cards can be rewritten with the new codes using a computer or other applicable device, such as a palm or remote control. For example, a computer program can contain the applicable coding for all the electronic devices that incorporate the disclosed technology. A user can select the functions to be incorporated for each device, placing the functions under an ID, and write them to the card. The user can then use the same swipe card to program each of the electronic devices as each device will recognize its ID an download only its codes, ignoring the programming for other devices. Alternatively, a small hard drive, such as used in digital cameras, can be used to program the various electronic devices. It will be obvious to those skilled in the art that the input means must be compatible with programming system implemented. The equipment can also have multiple methods of inputting data such as swipe card and computer download.

Figure 9:
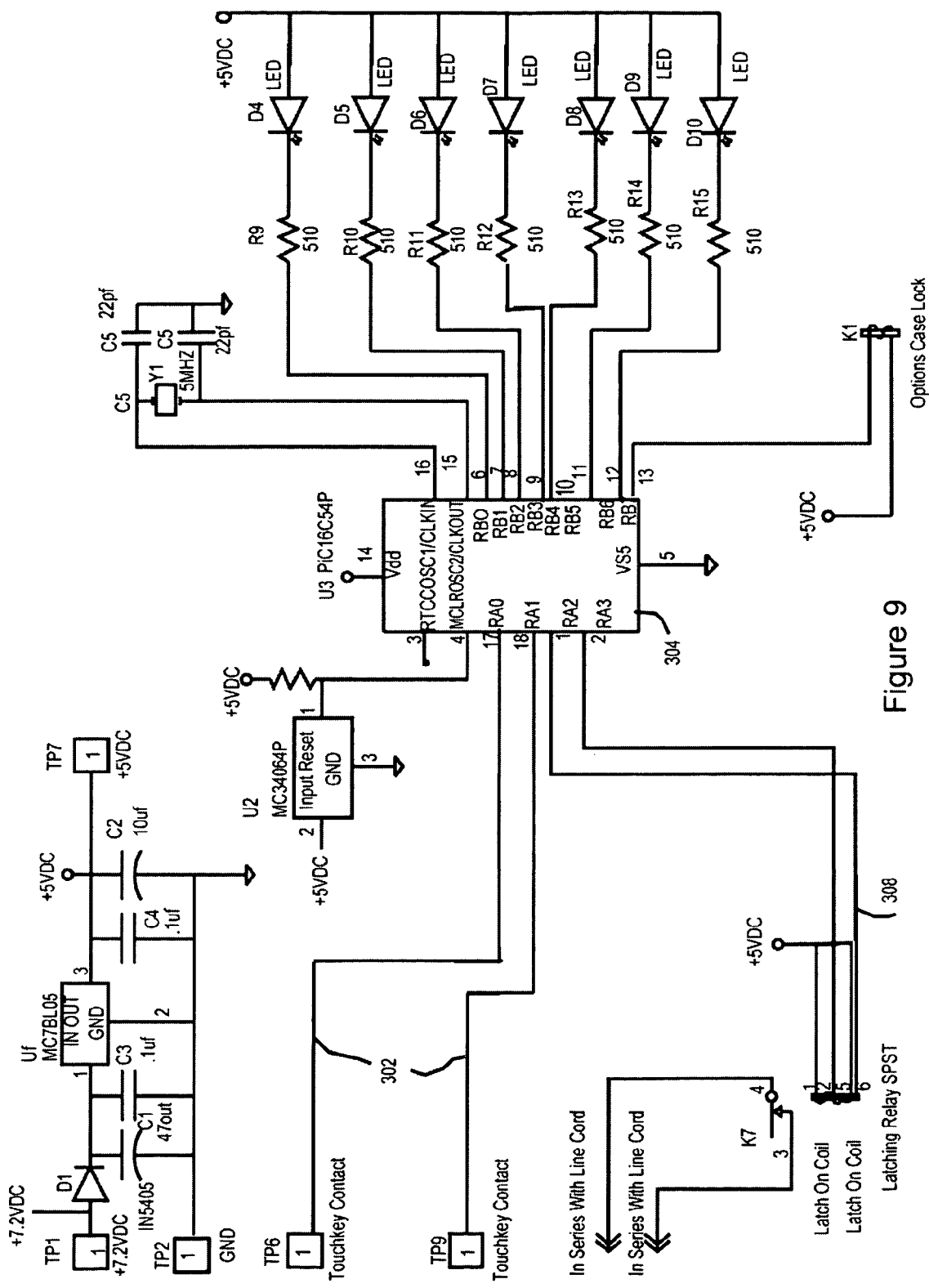
FIG. 9 is a schematic of the wiring for use with electronic systems.
Figure 10:
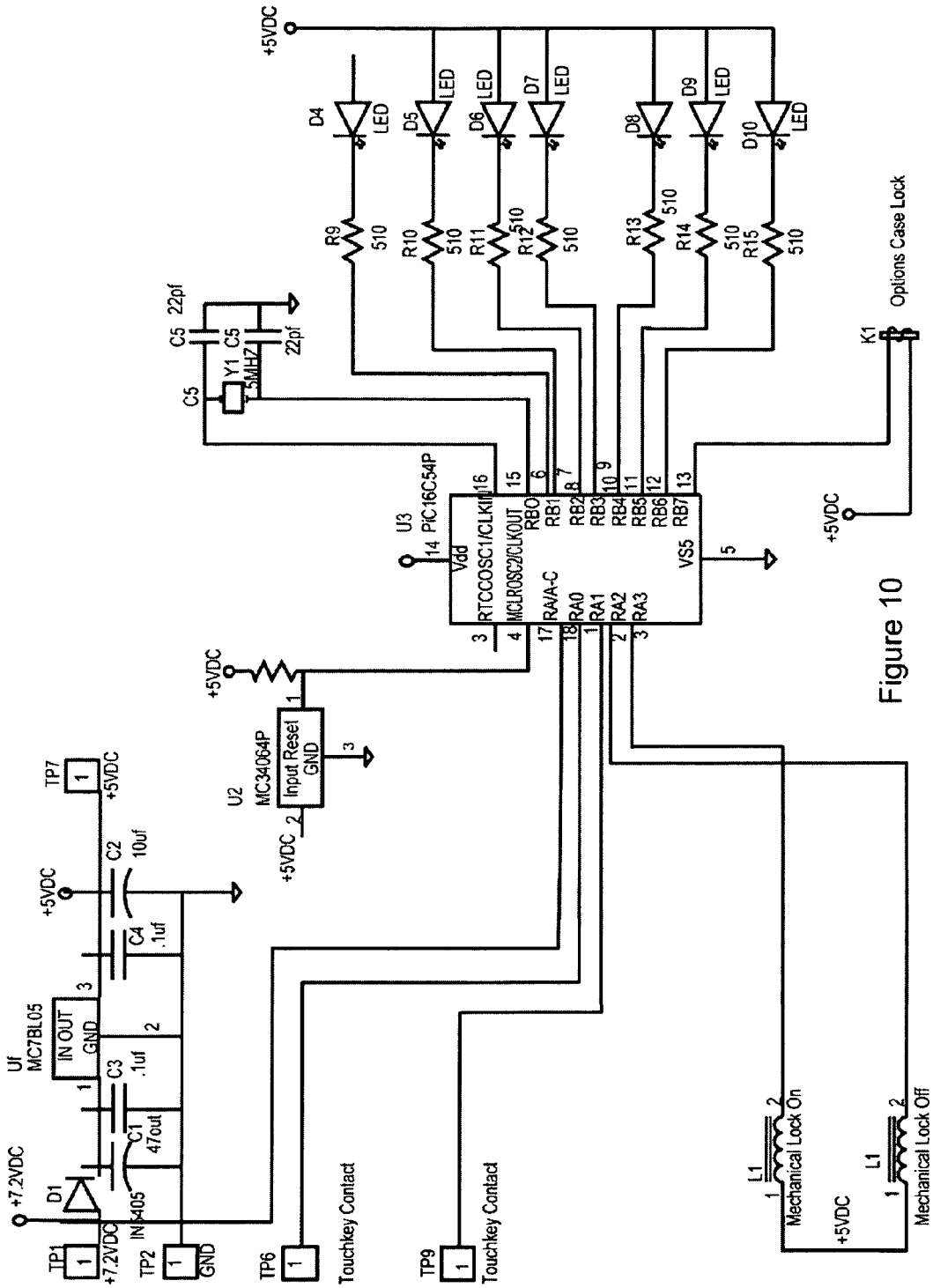
FIG. 10 is a schematic of the wiring for use with the locking system incorporating the analogue function.

The schematic of FIG. 9 is an example of the electronics for a system being incorporated into a computer, VCR, television, etc. As can be seen, the basic functioning of the system is the same as used for a battery operated, air or electric tools or other equipment. As in the schematics disclosed herein, the touch key wiring 302 feeds into the controller 304. In this embodiment, however, the electric wiring 306 is connected to the controller 304 through the latching relay wires 308. The schematic of FIG. 10 provides an example of the electronic layout, disclosed in FIG. 9, to incorporate the analogue function into the device through analog wiring 350.

As stated heretofore, cellular phones are a small sized, high dollar theft item that is difficult to protect. Using the disclosed system, the user could program the phone to shut off permanently at the expiration of a predetermined time, shut it down remotely or, alternatively at a preset time. For example, this would enable the user to tell the system that it should shut off at 9:00 p.m., or alternatively once the timer reach three hours from the programming time. Once shut down, the device would require reentry of the access codes. The phone, or other electronic equipment, can be programmed to stay on for an indefinite period of time, although it would negate the anti-theft mode of the system. However, in some instances with certain types of electronic equipment, this would not cause a problem. In these instances the system would be used to control other functions of the equipment, such as sleep or access restriction. For example, large equipment used by multiple would not necessarily ever be shut down but the ID codes would be used for controlled access. The disclosed system further enables a user to set the phone to shut down for a predetermined period of time, with automatic reactivation at the end of the time period. The ability to turn the phone, or other electronic equipment, off for a predetermined period of time, after which it automatically reactivates for a predetermined time based upon user programming, is beneficial for people attending meetings, movies, or some other activity that requires the phone to be turned off. Since the phone will automatically reactivate, the user does not need to worry about turning the phone back on. In the preferred embodiment, the phone can also be set to either receive calls or make calls, during a user programmed time period, as an option to the standard incoming/outgoing mode. Thus, if the phone is being loaned out and the owner of the phone does not want his/her calls to be picked up by anyone else, the phone can be set to forward all of the phone owner's incoming calls to their voice mail or other call forwarded location, while still allowing the person having the phone to make outbound calls. In the reverse mode, the person having the phone can receive calls, but cannot use the phone to call out. The partial use modes can also be programmed to be overridden by emergency or other preprogrammed numbers the can be either dialed or received. These would, for example, include parents, 911, etc.

It should be noted that for maximum security, the code enabling the programming disclosed herein is preferably on the phone, or other equipment's, permanent memory such as hard drive, microchip, etc. and is not solely dependent upon any temporary software, phone card or other removable system.

A delayed activation/deactivation can also be programmed into any of the systems to enable activation/deactivation at a specific time or after a certain amount of time has lapsed. Thus, in applications such as the electric tools used on a construction site, the foreman can program the tool to activate in thirty minutes and to stay activated for an additional eight hours.

In any electronic device the commands can be set through a variety of methods. On equipment that has a built in a screen, such as a digital camera or cell phone, the screen can be used to monitor the exiting settings and program new settings. In devices without screens an external LED display, voice activation, or some other means of forming communicating between the electronic equipment and the user can be incorporated. The existing command or program buttons can be used to program the device or additional buttons can be incorporated into the design at the time of manufacture. Additionally, remotes, infrared, Bluetooth, Internet, telephone or cell phone or other wired or wireless devices can be used as a programming tool. As disclosed herein, programming is generally done by the primary user, although in some embodiments portions of the programming can be done by secondary users. For example, a child who is taking the phone to the movies can be given access to change the programming to enable the phone to automatically turn off and turn back on. Unless otherwise programmed, the secondary user is not required to continually enter a password into the phone during the primary user activation period. This is, however, optional and would be dependent upon the electronic equipment being used.

In embodiments where the electronic equipment has the ability to be programmed and reprogrammed remotely, the primary user can also permanently or temporarily shut down the equipment. In most embodiments, the remote programming device will only need a primary password, although in some instances, both primary and secondary user passwords will need to be contained within the device.

Figure 11:
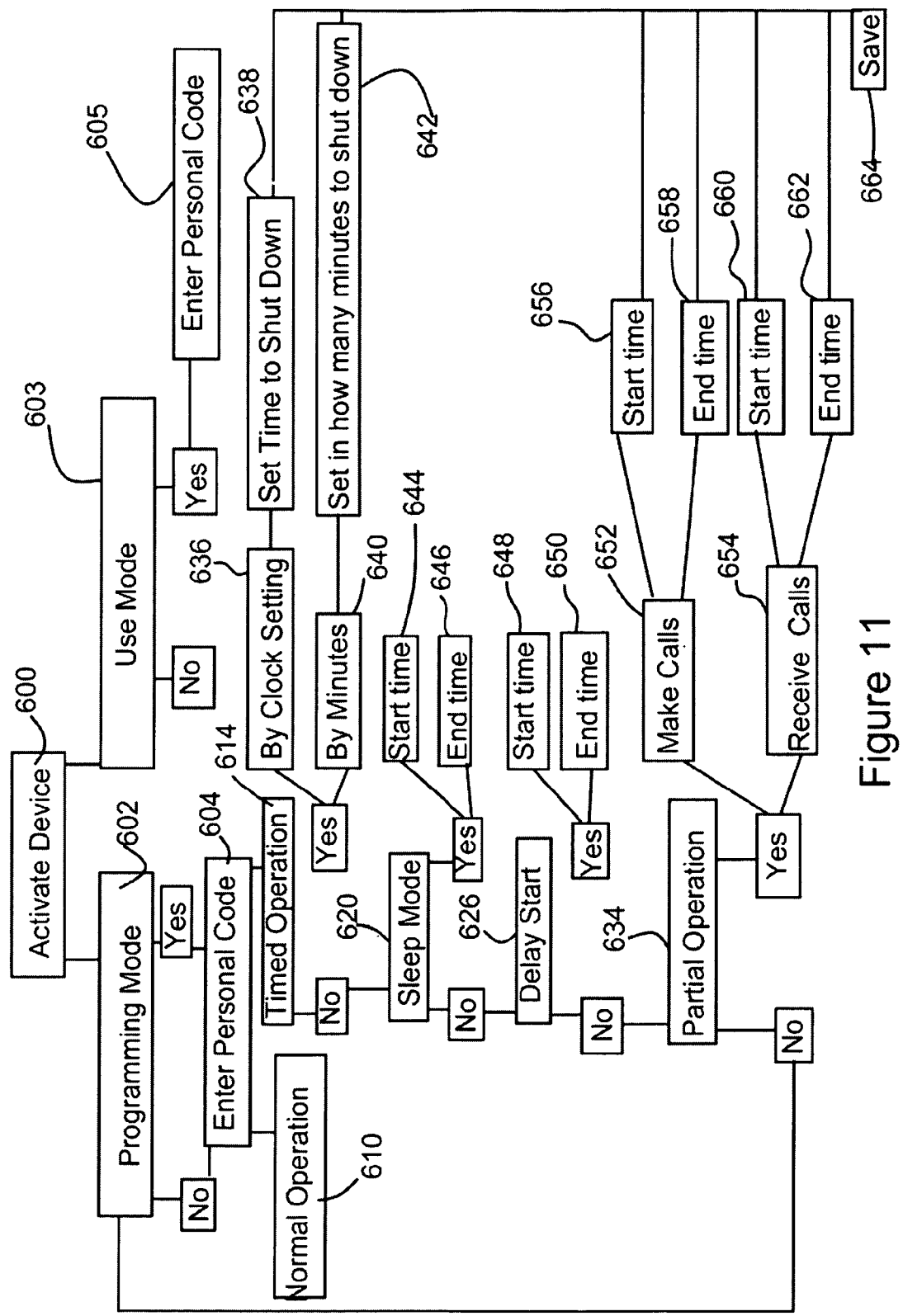
FIG. 11 is a flow chart for programming a multi-operation system.
Figure 12:
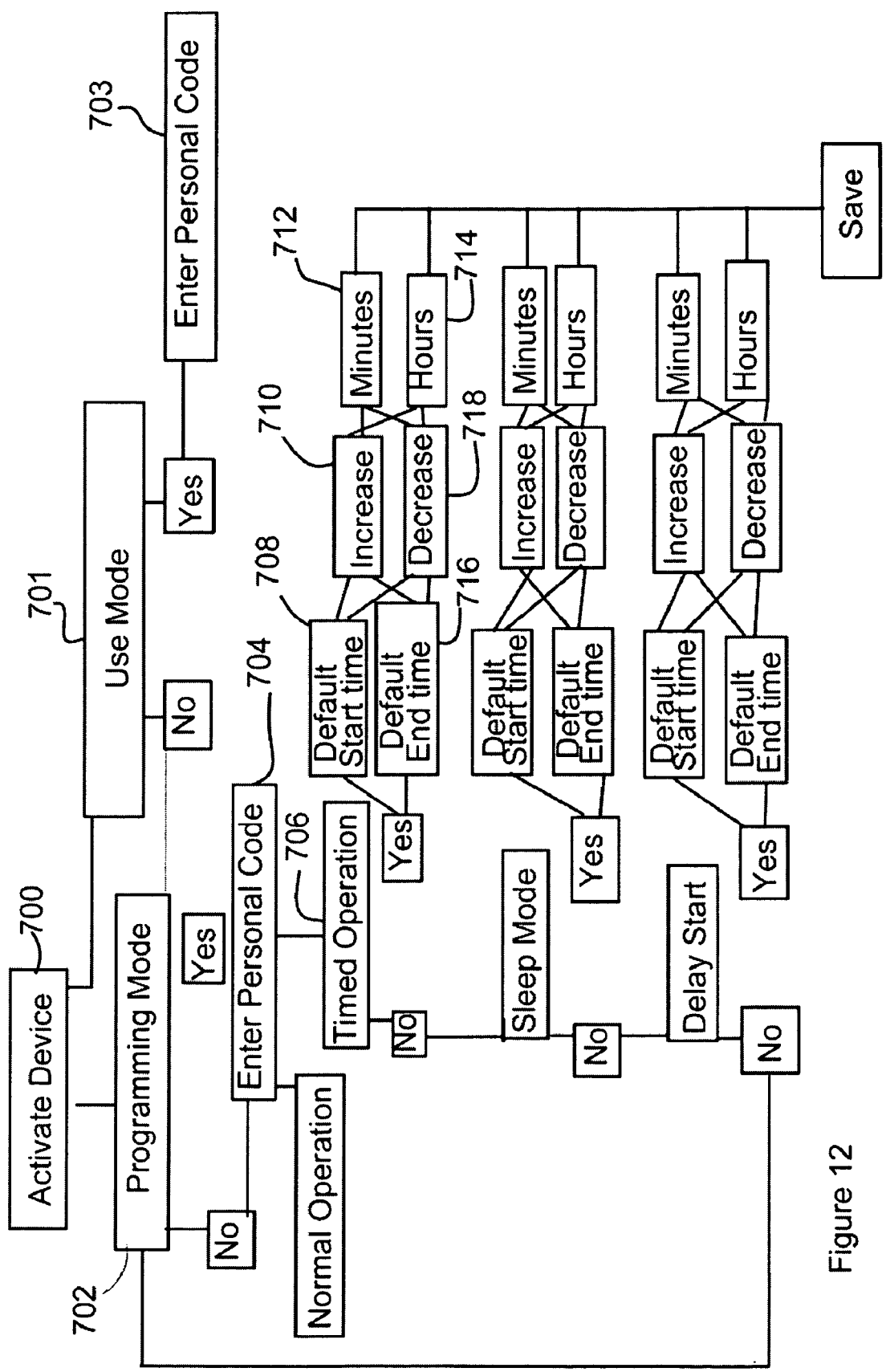
FIG. 12 is a flow chart for programming a single operation system.

A sample of a sequence for the user to follow when programming a cell phone is illustrated in FIGS. 11 and 12. Once the system is activated 600 the system inquires whether the user would like to activate the programming mode 602 or, if no changes are to be made entering the use mode 603.

Use Mode

If the user chooses to simply use the system 603 or 701 (FIGS. 11 and 12), they simply enter the personal code 605 or 703 and the system returns to the previous program or the standard operation for a time period set by the manufacturer. If the user chooses to alter the previous program, the user has either changed their mind or made the incorrect selection, they indicate "no", the programmed modes remain, as currently set and the option to go the program mode would be offered. It should be noted that the safety issues disclosed herein would be negated if the user was able to simply turn off the locking system. In the preferred embodiment the manufacturer sets a default maximum amount of time that the phone can be continuously activated, after which it automatically shuts down. This maximum operational period is preferably applicable not only to cell phones but all devices using the disclosed locking system. The maximum time can be set by the user using a separate code, either single or multiple uses, from the standard programming.

Figure 13:
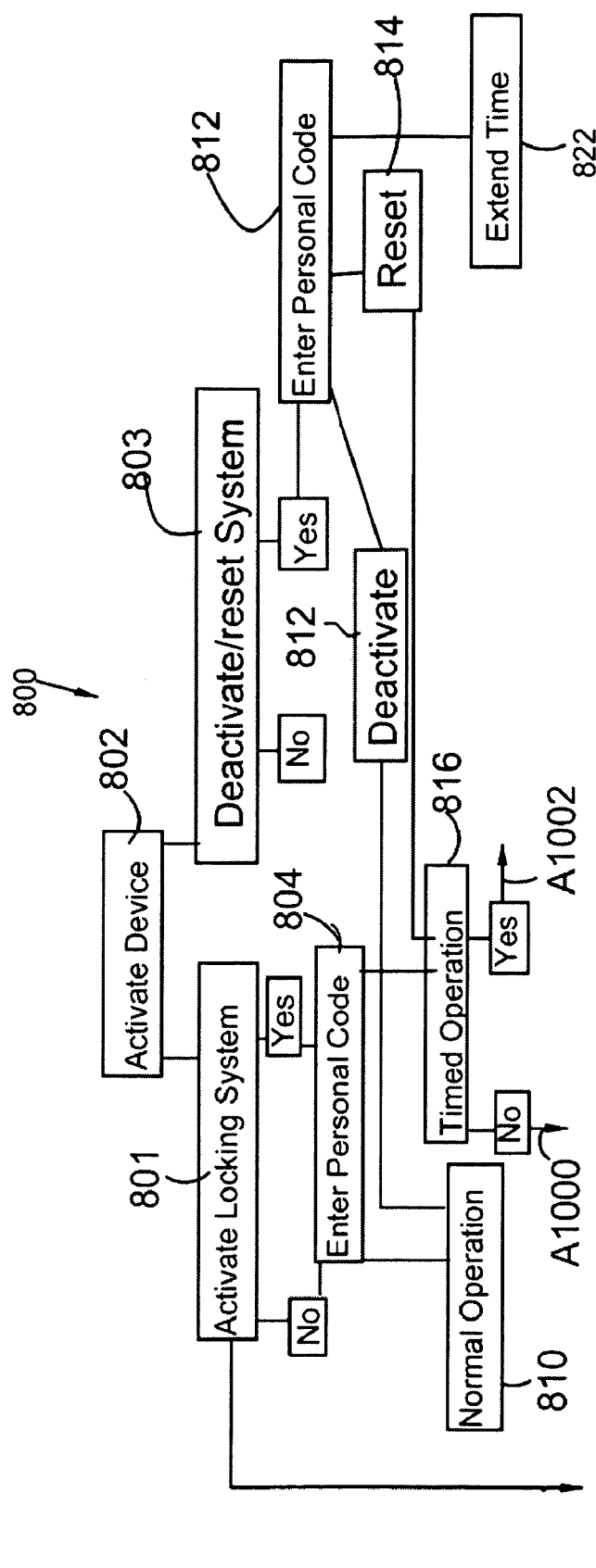
FIG. 13 is a flow chart for programming an electronic system including a reset option.

In FIG. 13, the additional option of resetting the system and extending time 822 is added, enabling the user to either deactivate or reset the system 803, extend the time 822 or activate the locking system 801. If the user chooses to deactivate the locking system, the user enters their personal code 812 and selects whether they wish to deactivate 812, reset 814 or extend the operating time 822. If deactivate 812 is selected the system enters fallback, or normal operation 810, again incorporating the preferred restriction of a maximum operating time. If the user selects to reset 814 the system then goes to the timed operation sequence 816, the system continues following arrows A1000 and A1002, following the sequence as set forth in FIGS. 11 and 12. It should be noted that arrow A1004 serves as the return from the "no" selection at the end of the programmable options. The extend time 822 enables the user to access the use extensions as described heretofore.

It should be noted that the term fall back or normal as used herein can relate to either the default set by the manufacturer or the last programmed codes. The fall back preference, manufacturer's default or last programmed codes, is set at the initial programming by the user at the time of set up.

Programming Mode

If user answers "yes" to the Program Mode 602, or activate, the system, as illustrated in FIGS. 11 and 12, asks if the user if they wish to program, and requests the personal code 604. If the code is correct, the system provides the option of either entering into the programming selections 706 or the fallback operation 610, again for the maximum operational period. This permits either the previously set parameters to be repeated until a change in programming is required or the factory set default mode entered. If the user answers "yes" to programming and the personal code 604 is correct, the user is then presented with several modes from which to select. These modes can be viewed by scrolling or, depending upon the size of the screen, all displayed with the arrow keys enabling selection. It should be noted that the sequence discussed herein in respect to this Figure is not intended to limit the invention in any way and different sequencing, alternative actions, etc. can be incorporated.

The Timed Operation mode 614 provides the user the ability to shut down the operation of the device by clock setting 636 or number of minutes 640. In the event the clock setting 636 is selected, the user then enters the time of day that the device shuts down 638. If the minutes 640 module is selected, the number of minutes prior to shutting down is requested 642. Preferably, a preset maximum time of operation will still prevail after which the user code would be required to reactivate the phone. The selection of "no" as a response brings up the sleep mode 620 operation which, if entered through, enables the user to set a start time 644 and an end time 646 during which the device is inoperable. "No" again bypasses the sleep mode 620 to the delay start 626 mode that enables the user to set the commencement of the start time 648 at a time later than the time of entry. The end time 650 is similar to the sleep mode end time 646. The partial operation mode 634 enables the user to separate the ability to make calls 652 from the ability to receive calls 654. When the make calls 652 operation is selected, the user enters the start time 656 and the end time 658 during which calls can be made. The receive calls 654 also permits start time 660 and end time 662 entry. In the event the user selects none of the modules the system returns to the "activate locking system" mode 604.

Depending upon the end cost, the device can be programmed to accept multiple different commands, such as a sleep mode 620 where it does not operate from the start time 644 to the end time 646, as well as a timed operation 614 in which the device shuts down 638 at 8:00 pm. Preferably any of the modes disclosed herein can have specific numbers, or systems, programmed that override the inability to make or receive calls. This would enable emergency contact to be made or received in any mode, including but not limited to when the equipment is locked due to "out of time" but still powered. This would include preprogrammed phone calls, email and IM addresses, etc.

Alternatively to pressing yes and no, the user can scroll through the options, pressing the enter button, or its equivalent, to make the selection.

Extend Time

The systems can be provided with an extend time mode 822, as illustrated in FIG. 13, and it should be noted that although the systems can be provided with this mode, as noted heretofore, it preferable does not permit endless extended time as that would eliminate the security concept. In this embodiment, the user activates the device 802, selects to activate/reset the system 803 and enters the personal code 812, the option of extend time 822 is presented. In the extend time option 822, the user can extend the time of the current programming equal to, or less than, the original program period unless otherwise programmed. Optionally, the amount of time for extensions can be determined by the manufacturer and unchangeable by the user. For example, the phone can either shut down upon expiration of a preprogrammed maximum operational period or after a preset number of extensions 822. Alternatively, with systems that incorporate primary and secondary user access codes, the extended time period can be changed through use of the primary user code.

In FIG. 12, rather than enter a specific start time, as set forth in the prior Figure, a default time has been entered. Once the user activates the device 700, responds positively to activating the locking system 702 and enters the personal code 704, the timed operation mode 704 appears. Upon positive selection of the timed operation mode 706, the default start time 708 is displayed, giving the user the opportunity to increase 710 or decrease 718 the time by either minutes 712 or hours 714. It should be noted that the use of minute and hours for example only and the time categories can be days, weeks, or any increment selected by the manufacturer. The default end time 716 is adjusted in the same fashion. Each of the modes in this Figure provide the default time options, however it should be noted that the default modes illustrated in FIG. 12 can be also included in conjunction with the timer setting modes illustrated in FIG. 11. Alternatively the user can be provided with the choice of whether to select the default or the timer settings.

FIG. 13 would be more applicable for cameras, TVs, computers and other devices that have only one type of operation. In other words do not have the dual operations, send and receive, as does a cell phone or a VCRs record and play. It should be noted that the system as disclosed in FIG. 13 is used in the same way as explained in FIG. 12.

Figure 14:
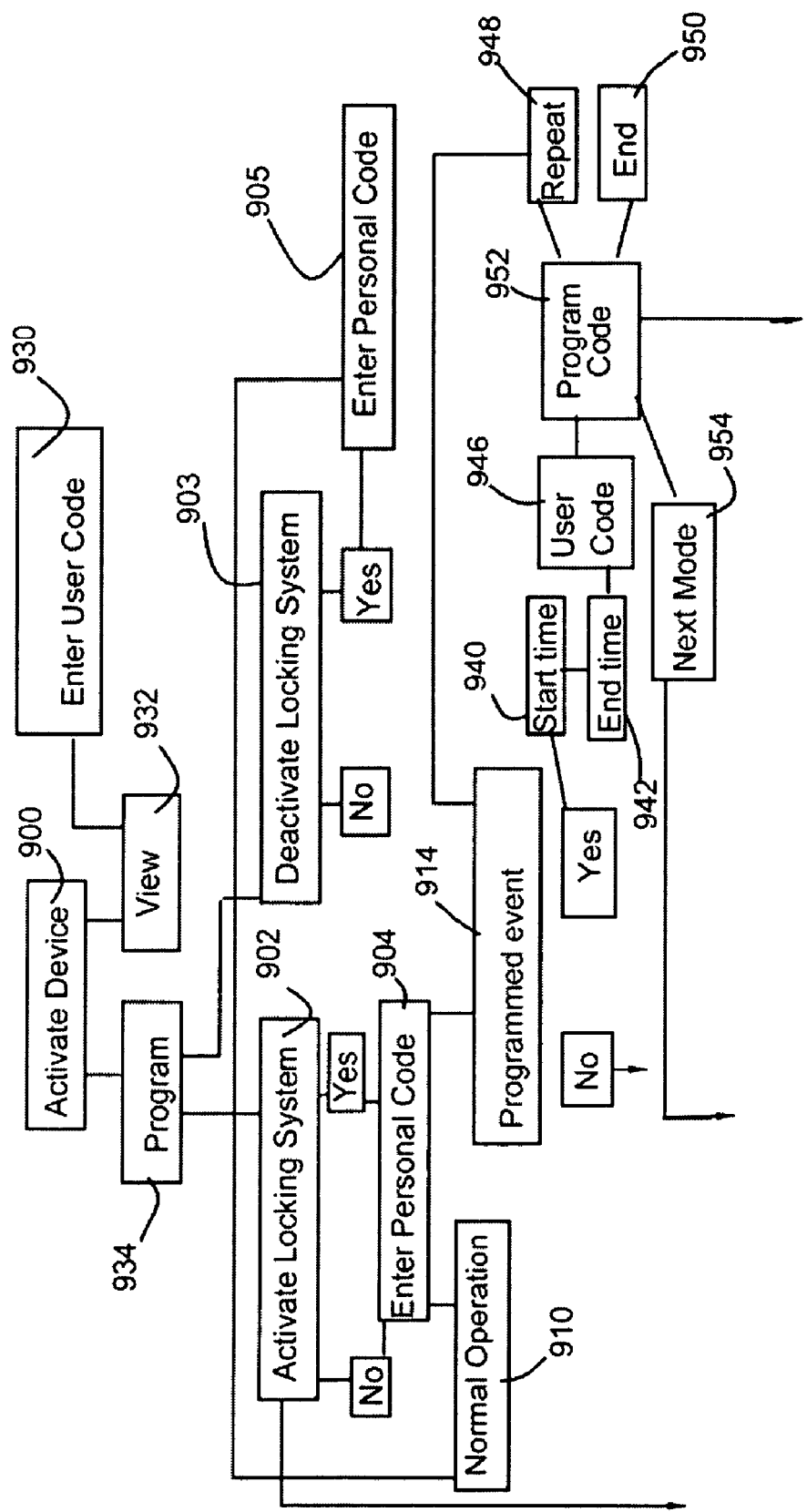
FIG. 14 is a flow chart for programming an electronic system designating specific events, times and users.

In the embodiment of FIG. 14, the user is able to program one or more specific events and their playing time. As used herein, an event includes computer programs, television shows, radio stations, or any other specific event that is viewed or listened to through the electronic device. For example, between 7:00 pm and bedtime, by controlling the stations that can be viewed, a 12 year old could only watch specific shows and, at bedtime, the TV would no longer be accessible. To accomplish this, the primary user activates the system 900, and is asked whether they are to program 934 or view 932. Entry of program 934 inquires whether the primary user would like to activate the locking system 902 or deactivate the system 903. As with the prior embodiments, if the primary user decides not to activate the system, the personal code 904 is requested and the system enters fallback operation 910, again with the maximum running period or previously programmed time. If the primary user wishes enter a programmed operation 614, they enter the start time 940, end time 942, user code 946 and the program code 952. This tells the system that at the start time the secondary, or non-programming, user matching secondary user code 946 can watch the program entered into the program code 952 while other programs are blocked. To facilitate programming, multiple user codes 946 can be entered, or checked off on a list. Once the program code 952 is entered, the user can either repeat 948 the programming event 914 or end 950 the event. When returned to the programmed event 914, the user can either program another event or continue on to other modes contained on the system, such as those illustrated in FIG. 13. Alternatively, a next mode 954 can be accessed directly from the program code 952 module.

If the user wishes to view 932, the user code 930 is entered and the system permits viewing of the preprogrammed events. This system is for use predominately on TV's and computers, however other applications will be evident to those skilled in the art.

Since many homes have more than one TV, VCR, etc. that would require programming, a master program can be placed on one of the devices that transmits, using Bluetooth or other wireless, or wired, technology, the codes to one or more of the other devices. Thus, a parent could sit at their computer and program all of the other devices within transmission range.

Figure 15:
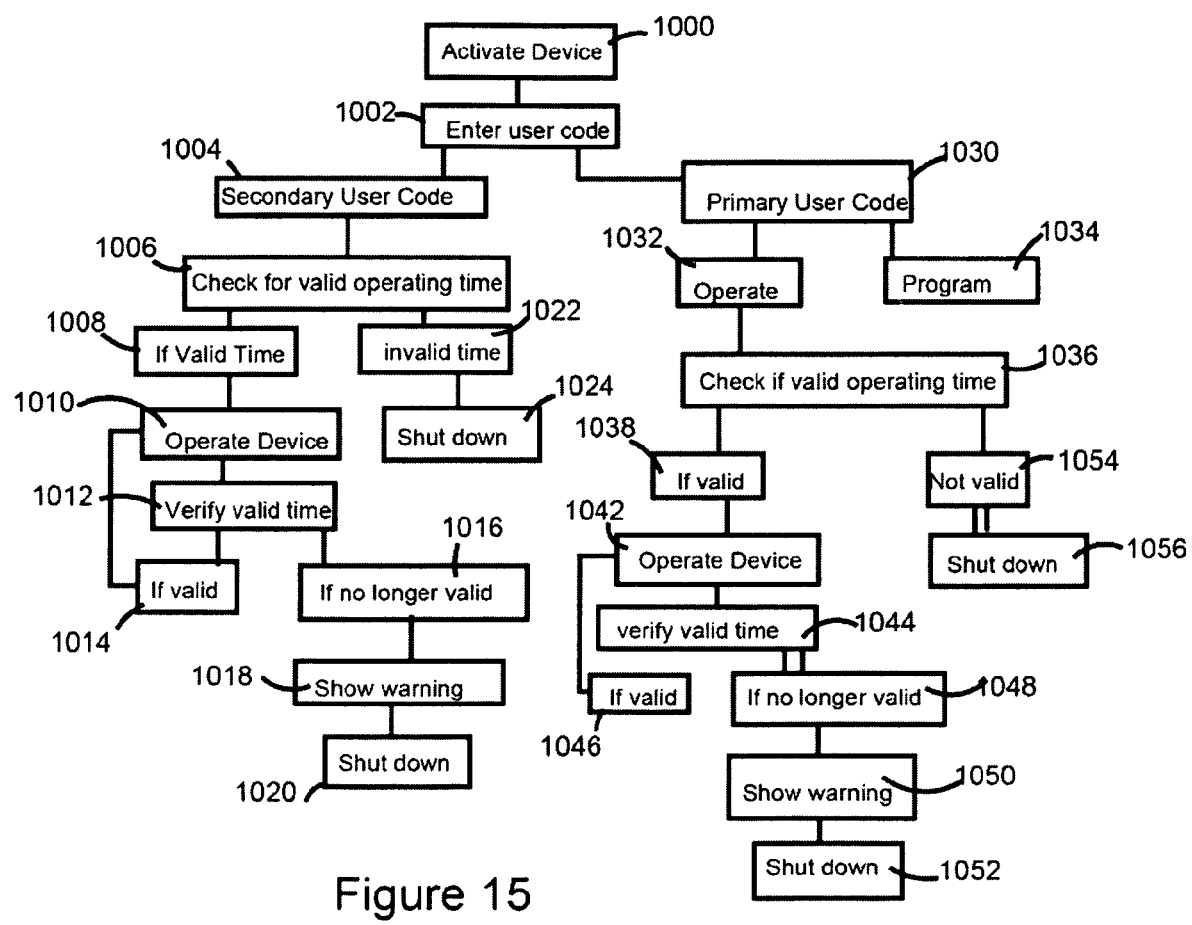
FIG. 15 is a flow chart of a primary and secondary user system using a timed base.

FIG. 15 illustrates the flow for a primary/secondary user system which can be incorporated on any electronic system, such as a cell phones, TV, VCR, camcorder, computer, camera, etc. The user activates the device 1000 and enters the user code 1002. In the preferred embodiments, once the system is activated 1000, a prompt is given, either visible or audibly, providing the user with instructions to enter the user code or the device will shut down in a predetermined period of time. The length of time that the message, or warning, is displayed can vary with the type of device and would generally be set by the manufacturer although it can be provided as part of the user set up. An "entry required" message or indicator can also be provided at start up or just prior to a change in programming or shutdown of the device, requesting users enter a password, within a preprogrammed period of time, to enable them to continue the current mode or switch to a different mode. The device can continue to run during the preprogrammed period of time prior to entry of the password. As the system is programmed with primary and secondary codes initially, the system will recognize the user's code. If this is a secondary user 1004, the system checks for valid operating time 1006 and if the time is valid 1008, proceeds to operate the device 1010. Based upon a time set by the manufacturer, the system will periodically verify that the operation is still within the programmed parameters and that the time is valid 1012. If there is time remaining in the system 1014, the device will continue to operate 1010. Once, however, that the system detects that there is no longer valid time remaining 1016, the system will show a warning 1018 and shut down 1020. Although the display of a warning is optional, it provides a convenience for the user. The warning can flash on saying the amount of time left and the action to be taken to extend the time. If, when the system recognizes the secondary user code 1004, the checking for valid operating time 1006 reveals that this is not a valid time 1022, the system will shut the device down 1024.

If the user code is a primary user 1030, they are asked whether they wish to operate the system 1032 or program the system 1034. If they wish to operate the system 1032, the system checks to see whether this is a valid operating time 1036. If valid 1038 the system proceeds to operate the device 1042, continually verifying the time 1044. As long as the time remains valid 1046 the system will continue to operate the device 1042. Once the time is expired 1048, a warning is shown 1050 and the device shut down 1052. If, upon initial check for valid operating time 1036, the system finds that the time is not valid 1054, the device is shut down 1056. Alternatively, a primary user code can eliminate the check for valid time and enter into the default mode. If the user selects to program 1034, the system follows the chart of FIG. 16. Alternatively, the systems can be programmed to ignore the time requirements with the entry of a primary user code.

As seen in FIG. 16, from the program option 1030, the primary user enters the user codes that are permitted access 1050 to this set. Once the codes are established the start time 1052 and the end time 1054 are entered. The channel or program 1056 is the entered and the user either ends the operation 1060 or goes to the next 1058 set, repeating the process.

The process illustrated in the flow chart of FIG. 15 can be used for any of the foregoing embodiments while the process of FIG. 16 is directed more toward TVs, computers and radios. It will be obvious to those skilled in the art that the indicators in the channel or program would be reflective of the applicable device. Therefore, a TV would indicate either channels or show name while a computer would indicate specific applications that could be used.

Figure 18:
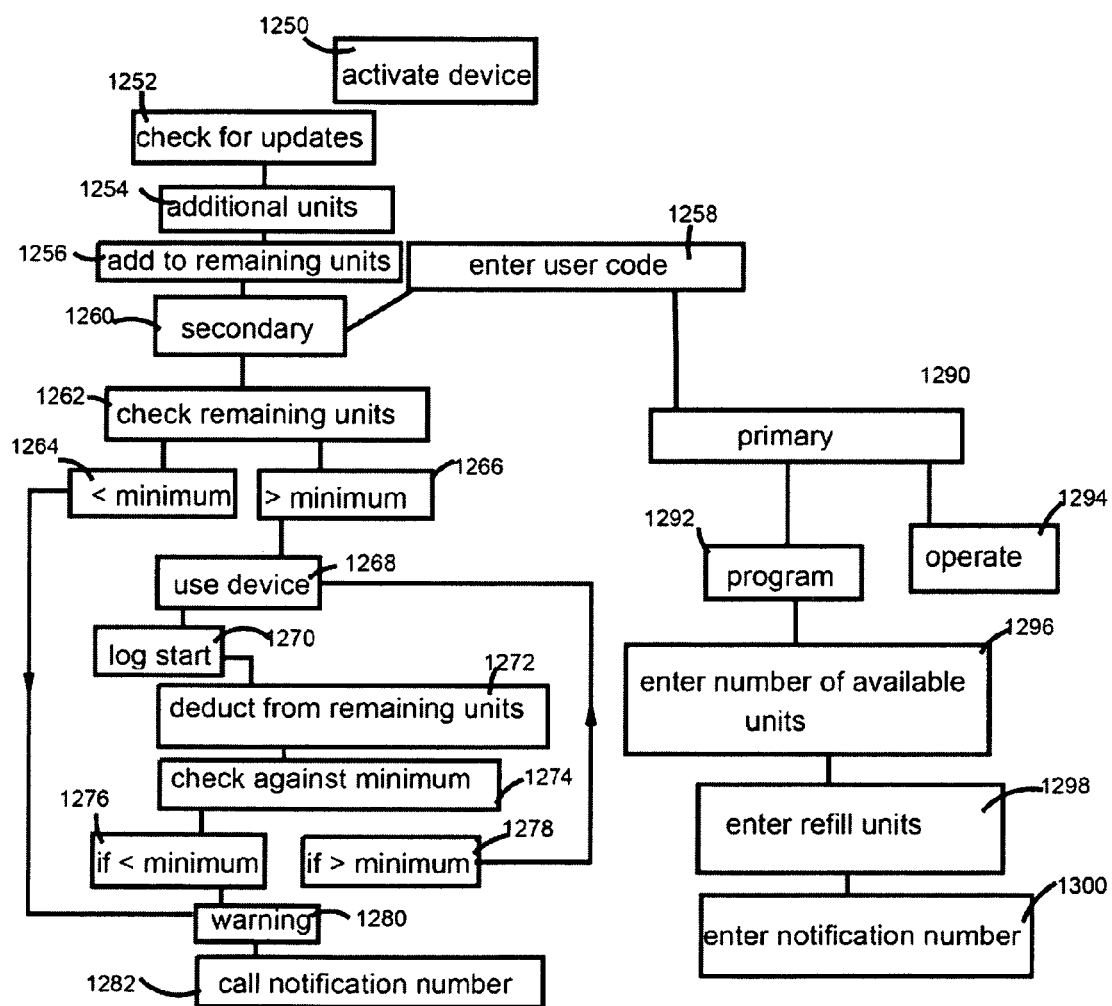
FIG. 18 is a flow chart for a system that monitors the number of units used.

The timing on the device can also be measured in the completion of predetermined units, such as revolutions of a wheel, time passed, piston stokes, etc. and is illustrated in FIG. 18. This permits an action to be taken based upon use, rather than upon a time period. In a cell phone this would be the number of minutes the phone would be used while in a car it would be reflective of either the piston strokes or the revolutions of a wheel.

Upon activation of the device 1250 the system immediately looks for updates 1252, in the way of instructions or additional units. Any additional units received 1254 are added to the remaining units 1256. Simultaneously, the system requests the entry of the user code 1258. If the code is a secondary 1260, the system checks the remaining units 1262 and, if there are less than the preprogrammed minimum units 1264 the system issues a warning 1280 and automatically sends a signal to the notification number 1282. If there are more than the minimum units remaining 1266, the device can be used 1268. The system logs the start 1270 of that cycle and loops through deducting from the remaining units 1272, checking against the minimum 1274 and taking action on that check. If the units are less than the minimum 1276 the warning 1280 is issued. If greater than the minimum 1278 the system continues its loop. Once the preset number of minimum units is reached, the control system can signal or send a message to a notification number 1282. The minimum number of minutes is preset by the user or manufacturer based on type of device and end use. Preferably the remaining units 1262 are displayed on the device either continuously or periodically.

If the user code 1258 is a primary user code 1290, the system provides the option to either program 1292 or operate 1294 the equipment. The operation mode 1294, not illustrated here, can follow an unrestricted or any of the other paths disclosed herein. The program mode 1292 requests the number of available units 1296, the number of refill units 1298 and the notification number 1300 which is to be called upon the device reaching the minimum units 1276.

For example, if a teenager's phone is programmed to have 100 available units, or minutes, to use and the minimum number that the parent wishes the child to have would be 20. When the child activated the phone, they would be notified that there were x number of minutes remaining and, once the phone reached the minimum number, it would automatically contact the notification number. The parent could then decide whether they wanted to refill the minutes or let the phone time run out. If they wished to refill the minutes, they would access the phone either physically or remotely, and follow the programming illustrated above.

This can also be used in equipment, such as forklifts, that should have maintenance every x number of units, whether it is based upon revolutions of the wheel, strokes of a piston or time. This provides the advantage that the service schedule is based upon actual use not theoretical use.

In an alternate embodiment, illustrated in FIG. 17, in addition to any of the applicable above modes, the system is programmed to completely shut down if the power is removed from the device. In electronic devices, there is a constant contact with power, either through the electric plug or battery, with many devices having a waiting mode. In the disclosed system, as long as the power is in contact with the device, the device does not register a disconnect. Once, however, the power is completely separate from the device, a disconnect is registered and the system requires entry of a master code. This helps protect the device from theft since a thief will know that they will be unable to restore the functionality of the device once unplugged.

In FIG. 17, once the system is activated 1201, the system continually checks for power 1200, with the presence of power 1202 creating a loop. If there is no power 1204, caused by separation of the battery from the device, electrical cord from the plug, etc. the system sets the disconnect register 1206, enters a "password required" mode, and causes the disconnect status 1208 to be registered as "on". It should be noted that the default status, when receiving power is "off". Once power is completely disconnected, the no power 1204 state causes the disconnect register 1206 to switch the disconnect status to "on" status; causing a total shut down of the system 1214. After the restoration of power 1216, the next attempt to activate the device 1228 will cause the system to check the register disconnect 1226. At this point, the disconnect status 1208 is "on" 1212 indicating the device requires the entry of the master code 1218. Once the master code is entered 1218, the code is verified 1220 by the system. If the code is recognized, or "yes" 1224, the system will allow the device to be run 1230. If, however, the system does not recognize the entered master code 1222, it requests a reentry of the code 1218. The system will continue to loop 1232 for a predetermined number of times set by either the manufacturer or the user during set up.

In rechargeable devices, such as cell phones, power tools, etc., in addition to removing the power source, reentry of the password can also be required when the device is placed onto the battery recharger. In this embodiment the system constantly monitors the power within the device, allowing for the gradual decrease that is normal due to use. Any extreme fluctuation in power, whether it is an increase, such as regeneration, or a decrease, such as removal of power, requires the reentry of the password.

Figure 19:
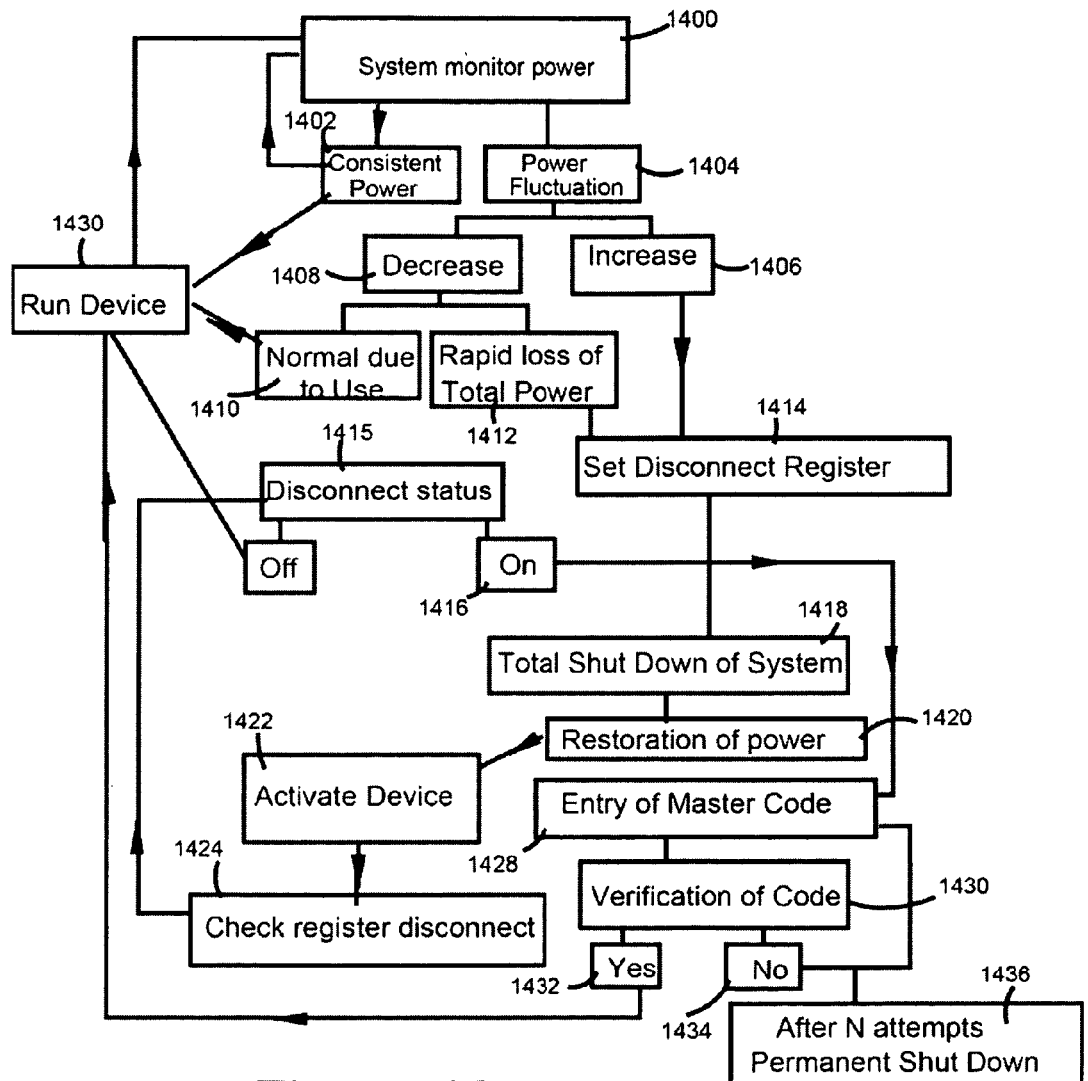
FIG. 19 is a flow chart that basis shut down upon power fluctuation.

In FIG. 19, the system differentiates between a decrease in power due to use, decrease due to removal and an increase in power. This embodiment is most applicable to devices with batteries, although it can also be used for plug in devices. The power is monitored 1400 by the system with consistent power 1402 creating a loop. If, however, there is a power fluctuation 1404, the system checks whether it is an increase in power 1406 or a decrease in power 1408. A decrease in power 1408 due to normal use 1410 takes the system to run device 1430 and continues the loop. However, if there is a rapid loss of total power 1412, the system sets the disconnect register 1414, creating a total shut down of the system 1418. Once power is restored 1420 and the device activated 1422, the disconnect register is checked 1424 and the disconnect status 1415 checked. If it is off the device can be run 1430 and the system returns to the loop. If, however, the disconnect status 1415 is on 1416, the system requests the entry of the master code 1428. If the code is verified 1432, the device can be run 1430. If the code is incorrect 1434, the system loop for a predetermined number of attempts 1436 until there is permanent shut down.

Figure 20:
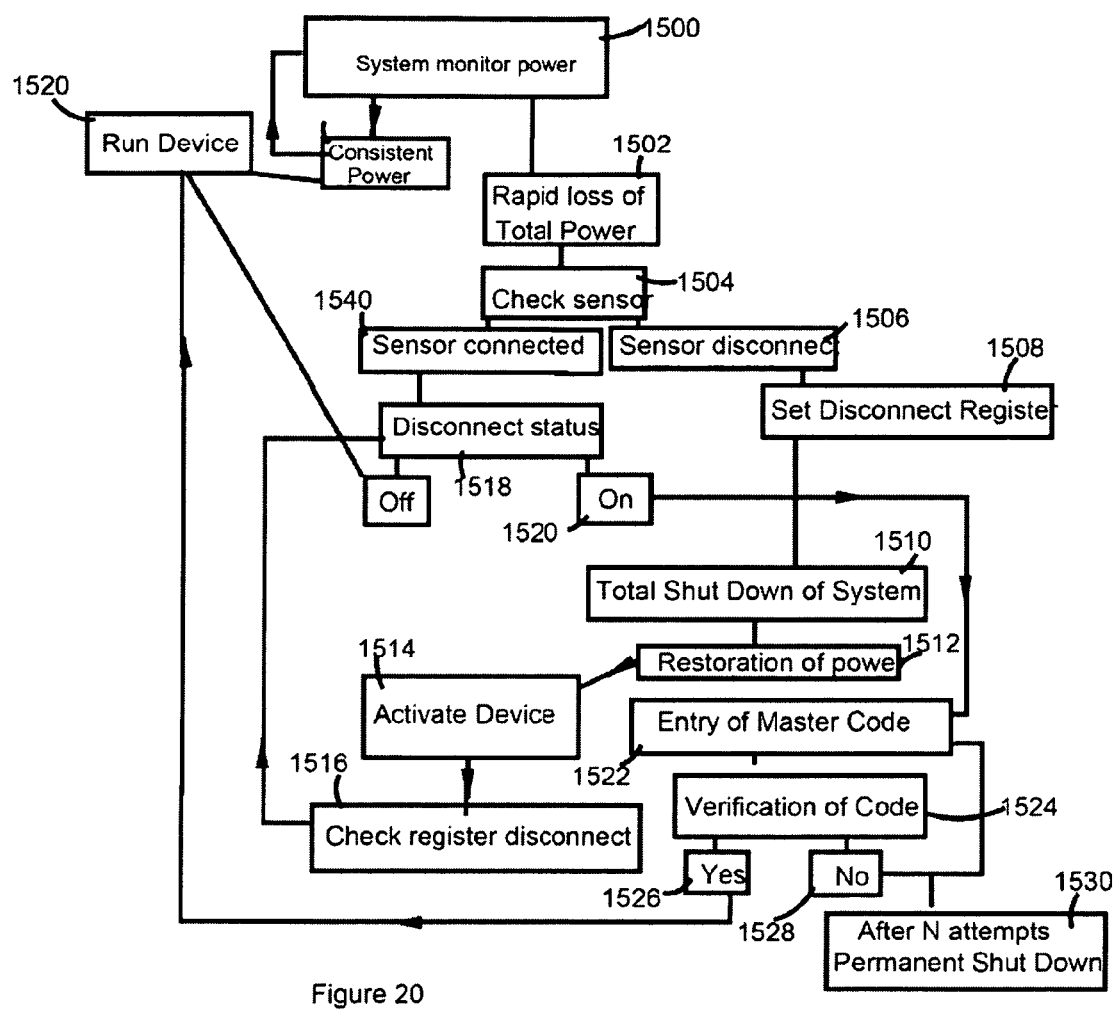
FIG. 20 is a flow chart that differentiates between power outages and complete power removal.

In the preferred embodiment for plug in devices, as illustrated in FIG. 20, the system monitors the power 1500 detects the difference between the loss of power 1502 due to the removal of the power source and the loss of power due to an outage. In the illustrated embodiment a proximity sensor is placed in the plug that registers whether or not the plug is registering the proximity of the socket. When there is a rapid loss of total power 1502, the system checks the sensor 1504 to determine the status. If the sensor remains connected 1540, the disconnect status 1518 remains in the off position.

If, however, the sensor is disconnected 1506 the disconnect register is set 1508, creating a total shut down of the system 1510. Once power is restored 1512 and the device activated 1514, the disconnect register is checked 1516 and the disconnect status 1518 checked. If it is off the device can be run 1520 and the system returns to the loop. If, however, the disconnect status 1518 is on 1520, the system requests the entry of the master code 1522 for verification 1524. If the code is verified 1526, the device can be run 1520. If the code is incorrect 1528, the system loop for a predetermined number of attempts 1530 until there is permanent shut down.

The flow chart of FIG. 20 is only an example and other methods for recognizing the power outage due to unplugging will be evident to those skilled in the art. Another method that can be used would be to place a motion sensor on either the plug or the device itself to sense movement. Any sensors would be connected to an internal battery that would enable the system to differentiate between a power outage and an unplugged unit. Since the main purpose of this embodiment is to prevent theft, the system can be provided with an override code that can be used by the owner to move the device from location to location.

Figure 22:
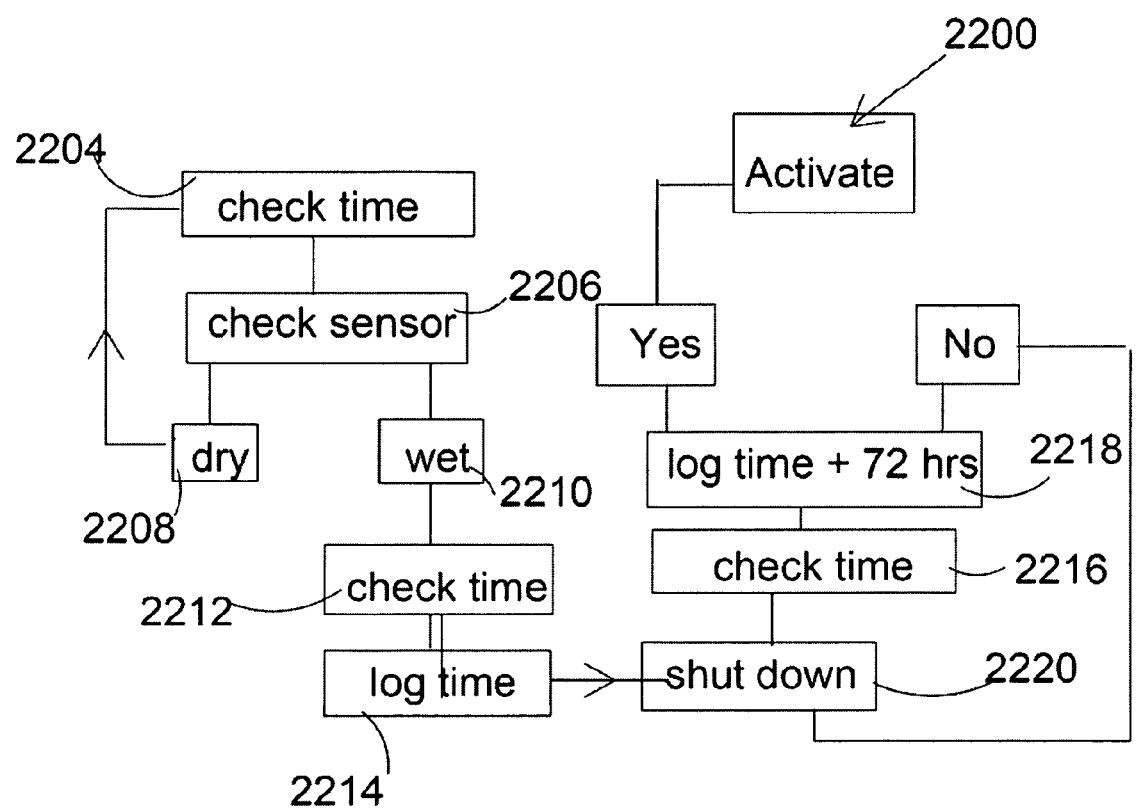
FIG. 22 is a flow chart of a subprogram to deactivate the electronic device when it is in contact with water.

Power outage can also occur when exposed to water. Although mostly applicable for cell phones, the use of a water sensor can incorporated in any battery operated equipment. For example, once a cell phone battery is wet, the battery should be removed and the phone not used for three days. In the example sequencing 2200 of the subprogram illustrated in FIG. 22 the system checks the time 2204 and then checks the sensor 2206. If the sensor is dry 2208 it continues to loop. If, however, the sensor is wet 2210, the system checks the time 2212, logs the time 2214 and shuts down 2200. The system periodically checks the time 2216 to see if it is log time plus 72 hours 2218. It the appropriate time has passed the phone can be activated 2200. If, however the time has not passed, the system continues to shut down 2220. As the primary battery will have been removed, the power is obtained from a sealed secondary battery. The power drain on the battery will be extremely small and the battery can be recharged from the primary battery while installed. Other means of powering the subprogram can be used in accordance with current technology.

When any of the above embodiments are used with networked computers, the system can be programmed to put one or all of the computers into either a password protect mode or password clear mode, if one is unplugged. Alternatively, the system can be programmed so that during business hours only the computer, or other device, unplugged goes into password protect mode but after business hours, all devices go into that mode if a single unit is unplugged.

As an additional anti-theft measure, the device can further have an alarm that is triggered by the disconnection from the power source. The alarm, visual, audio or both, must have its' own power, preferably through rechargeable batteries, as it will only be activated at the absolute removal of power from the device. Thus, if the TV is unplugged an alarm is sounded, however, as stated heretofore, the system should be programmed to prevent the alarm from sounding during a power outage. The disclosed system can further be tied in with the household alarms system through a variety of methods that will be evident to those skilled in the art. For example a transceiver, which interacts with a transceiver in the alarm system, could be placed within the device and upon a predetermined separation distance, the alarm is triggered. Alternatively, a timed motion sensor could be used that will activate after a preprogrammed time period of movement. Other methods, such as Bluetooth, magnetic strips, etc. can be used to activate the in house alarm system. A GPS chip can also be incorporated to track any of the devices and facilitate the location for recovery or, in the case of a cell phone, to locate a person. For safety and recovery reasons, the GPS chip should remain active during all modes, including deactivation. To enable the user to move the device without setting off the alarm, an override password is programmed into the system, thereby turning off the alarm interaction for a predetermined period of time. It is preferable that the override code does not turn off the alarm totally as it would be easy for a user to forget to reactivate the alarm.

Figure 21:
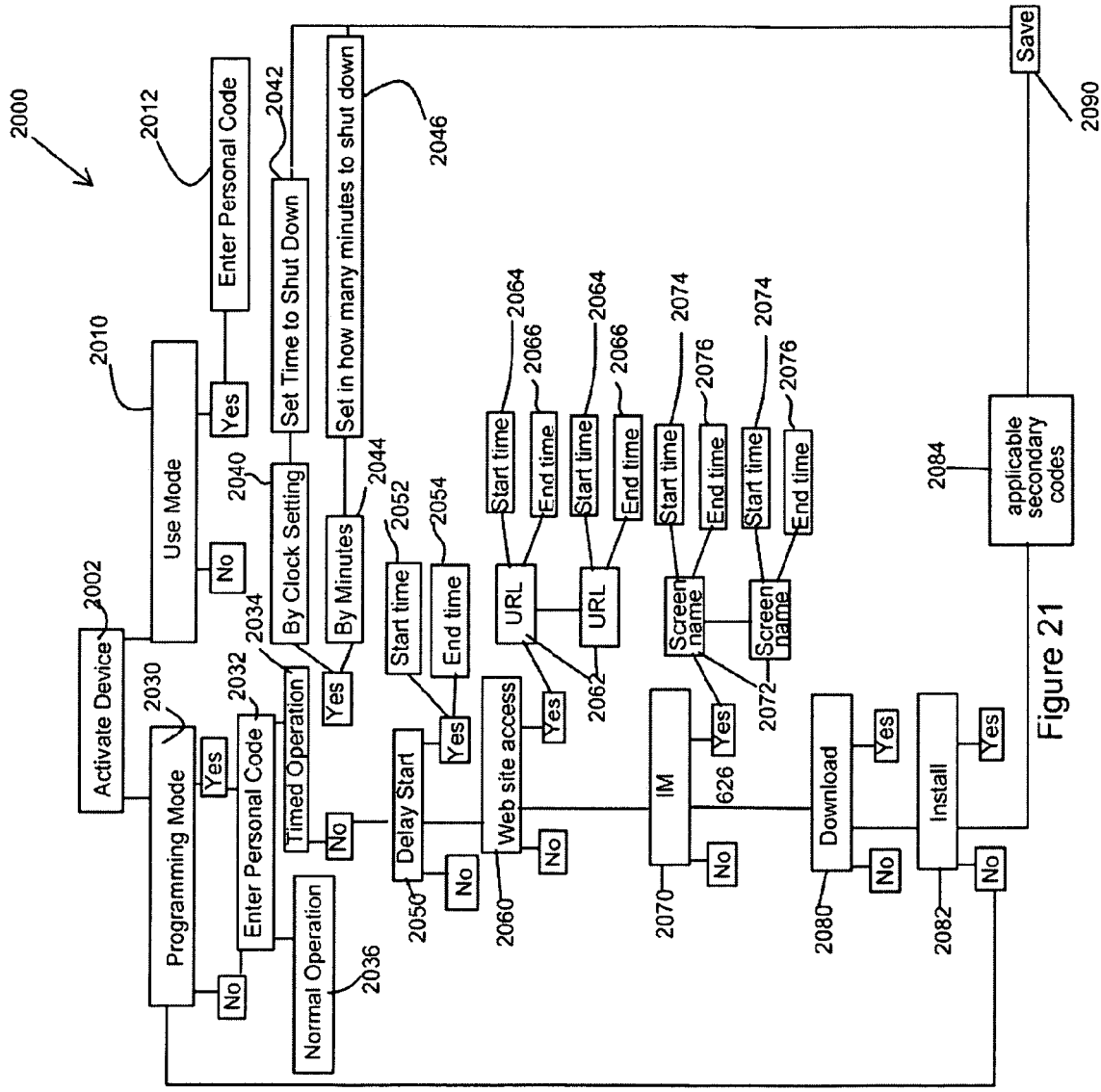
FIG. 21 is a flow chart illustrating use of the multiple modes for multiple users.

Use of the system with a computer would provide the multiple modes for multiple users similar to the cell phone. As seen in the example illustrated in FIG. 21, the primary user would activate the system 2002 and make the selection whether to enter programming 2030 or use 2010 mode. If Use Mode 2010, the personal code would be entered 2012 and the user would have access to the computer as programmed for that code. If the user is a primary user selecting programming mode 2030, the personal code is requested 2032 giving the use the selection of normal operation 2080 or timed operation 2034. In timed operation 2034 the user can select to set the time limitations by clock setting 2040 or by minutes 2044. If using the clock settings 2040 the time to shut down 2042 is entered. If shutting down the equipment after a certain number of minutes used 2046, the number of minutes is entered. It should be noted that the timed operation starts at the time of entry and extends from that point. To set use starting at a later time, delayed start 2050 is used. The delayed start 2050 permits entry of a start time 2052 and end time 2054. Although this example does not use the number of minutes that criteria could be used rather that an end time. If access to the web 2060 is allowed, the accessible URL's 2062 are entered with start 2064 and end times 2066 for each URL 2062. Although reference is made to permitted URL's it should be noted that it can also be non-permitted URL's. The process is repeated for instant messages (IM) 2070 where permitted screen names 2072 with the start time 2074 and end time 2076. Again, this can be switched to non-permitted screen names.

The timed control of websites and IM screen names enables the parent to control factors such as permitting IM communication only with certain people during certain times in order to avoid distractions during homework time. Additionally, gaming websites can only be used for a specific period of time.

In this example, permission to download 2080 or install 2082 is also programmable. This would prevent unauthorized people for either downloading or installing programs on a computer.

Although the entry of the applicable secondary codes 2084 is entered at the end of the programming, they could also be entered at the beginning. The manufacturer or part of the initial settings of the system can determine the positioning of the secondary code entry. Finally the parameters are saved 2090. In the case of a computer, which is used as this example, the modes can consist of voice over IP, specific applications, etc.

The disclosed technology relies, in many embodiments, on the use of passwords to access the system. In the event that a password is lost a call in customer service, either human or remote, can be established. Each device would have a password default code that would display a series of numbers. These numbers would be given the customer service and the corresponding default password would be provided. The default password would permit the user to enter the set up stage of the system and enter the new password. For additional safety, the default code can be tied to caller ID. This provides two advantages; first if the number from which the call is made does not correspond to the initial phone number upon registration, additional data will be required. This is currently in use by credit card companies to activate cards and can easily be adapted to the disclosed technology. Additionally, if the call is not made from the registered number, and the equipment has been stolen, the recordation of the phone number will help police locate the stolen merchandise.

One use of the disclosed invention is in commercial industries with workers using company owned tools and equipment, computers, motel TVs and VCRs, etc. The tools, or other equipment, are activated in the morning to run for an entire shift, at which point they shut down. This prevents theft from outside sources as well as employees. Additionally by reactivating the tools each morning, a "safety check" can be incorporated with the activation to prevent faulty equipment from being used.

Since other modifications and changes varied to fit particular operating requirements and environments will be apparent to those skilled in the art, the invention is not considered limited to the example chosen for the purposes of disclosure, and covers all changes and modifications that do not constitute departures from the true spirit and scope of this invention.

What is claimed is:

1. An operating control system for electronic equipment, said control system being internal to said electronic equipment and having:
   a. an activation/deactivation member;
   b. at least three user programmable modes;
   at least one user access code, at least one of said at least one user access code being capable of programming parameters and accessing each said at least three user programmable modes
   d. an activate programming mode, said activate programming mode accessible with at least one of said at lease one user access code for programming said parameters for said at least three programmable modes;
   g. input means to receive said user access codes, said programmable mode selection;
   h. an internal microprocessor for receiving input from said input means and executing said program parameters;
   i. a use mode, said use mode being activated by entry of said at least one user access code to enables use of said multiple user programmable modes based upon said parameters;
   wherein said microprocessor controls operation of said electronic equipment based upon said parameters in said at least three user programmable modes for each of said at least one user access code.

2. The operating control system of claim 1 having multiple user programmable activation periods, each of said multiple user programmable activation periods being set by a user for each of said at least three user programmable modes.

3. The operating control system of claim 1 wherein said electronic equipment is a cell phone.

4. The operating control system of claim 3 wherein said at least three user programmable modes include, normal operation and at least one member from the group of sleep mode, delayed start, at least one extension mode, selective number blocking, and partial operation, each of said at least three programmable modes being operable for a user programmed period.

5. The operating control system of claim 4 wherein said at least one member is partial operation and said partial operation includes making outbound calls and blocking inbound calls.

6. The operating control system of claim 4 wherein said partial operation includes receiving inbound calls and blocking outbound calls.

7. The operating control system of claim 4 wherein said partial operation includes programming permitted numbers for outgoing calls.

8. The operating control system of claim 4 wherein said partial operation includes programming permitted numbers for incoming calls.

9. The operating control system of claim 1 wherein said electronic equipment is a computer.

10. The operating control system of claim 9 having multiple user programmable activation periods, each of said multiple user programmable activation periods being set by a user for each of said at least three user programmable modes.

11. The operating control system of claim 9 wherein said at least three user programmable modes include, normal operation and at least one member from the group of URL access, instant message access, timed operation, and delayed start, each of said at least three programmable modes being operable for a user programmed period.

12. The operating control system of claim 9 wherein one of said user programmable modes is limiting downloading programs to secondary codes having programmed access.

13. The operating control system of claim 9 wherein one of said user programmable modes is limiting program installation to secondary codes having programmed access.

14. The operating control system of claim 11 wherein said user selecting normal operation returns said electronic equipment to the previously activated sequence for the remainder of said activation period.

15. The operating control system of claim 1 wherein a secondary user has programming rights, said programming rights being determined and programmed by said primary user.

16. The operating control system of claim 1 wherein a frequency of entering said secondary user access code to access said electronic equipment is based on primary user programming.

17. The operating control system of claim 1 where said input means is a remote, said remote requiring at least one password.

18. The operating control system of claim 2 wherein said programmable time period is based on counting down a programmed number of units.

19. An operating operating control system for electronic equipment, said control system being internal to said electronic equipment and having:
  a. an activation/deactivation member;
  b. at least three user programmable modes;
  d. at least one user access code, said at least one user access code programming parameters for each said at least three user programmable modes and accessing said at least three user programmable modes based upon said program parameters;
  e. an activate programming mode, said activate programming mode accessible with at least one of said at least one user access code for programming said parameters for said at least three programmable modes;
  g. input means, said input means to receive said user access codes, said programmable mode selection;
  i. an internal microprocessor, said internal microprocessor receiving input from said input means and executing said program parameters;
    wherein said microprocessor controls operation of said electronic equipment based upon said parameters in said at least three user programmable modes.

20. An internal operating control system for battery powered equipment, said control system having:
  a secondary power source;
  a water sensor;
a sub-program, said sub-program preventing reactivation of said battery powered equipment for a predetermined period of time from the activation of said water sensor.

* * * * *